United States Patent [19]

Howard

[11] Patent Number: 4,534,577
[45] Date of Patent: Aug. 13, 1985

[54] REMOTELY ADJUSTABLE STEERING COMPENSATOR

[76] Inventor: Durrell U. Howard, 306 Krameria Dr., San Antonio, Tex. 78213

[21] Appl. No.: 512,852

[22] Filed: Jul. 11, 1983

Related U.S. Application Data

[63] Continuation-in-part of Ser. No. 93,968, Nov. 14, 1979, Pat. No. 4,410,193, and a continuation-in-part of Ser. No. 296,617, Aug. 27, 1981, Pat. No. 4,418,931.

[51] Int. Cl.$^3$ .............................................. B62D 5/06
[52] U.S. Cl. ................................ 280/90; 74/388 PS; 91/368; 180/132; 280/94
[58] Field of Search ............... 280/90, 94, 89, 271, 280/771; 180/79, 141, 142, 143, 213, 132; 91/5, 390, 368; 92/65, 131, 134; 60/415, 417; 74/388 PS; 114/150

[56] References Cited

U.S. PATENT DOCUMENTS

| | | | |
|---|---|---|---|
| 962,257 | 6/1910 | Rockwell | 280/773 X |
| 1,745,117 | 1/1930 | Plank | 280/103 |
| 2,657,535 | 11/1953 | Levy | 60/573 |
| 2,690,916 | 10/1954 | Gilliam | 280/81 A |
| 3,056,461 | 10/1962 | Quayle | 180/213 |
| 3,111,103 | 11/1963 | Bennett | 114/285 |
| 3,171,298 | 3/1965 | Henry-Biabaud | 180/143 X |
| 3,183,992 | 5/1965 | Brueder | 180/143 |
| 3,333,863 | 8/1967 | Bishop | 280/943 |
| 3,373,631 | 3/1968 | Henry-Biabaud | 74/495 |
| 3,426,612 | 2/1969 | Henry-Biabaud | 74/495 |
| 3,583,515 | 6/1971 | Schwenk | 180/141 |
| 3,628,487 | 12/1971 | Bennett | 114/287 |
| 3,636,794 | 1/1972 | Wicklin | 74/495 |
| 3,695,204 | 10/1972 | Bennett | 114/286 |
| 3,848,885 | 11/1974 | Hefren | 280/94 |
| 3,882,954 | 5/1975 | Inoue | 180/143 |
| 3,958,656 | 3/1976 | Niemann | 180/79.1 |
| 3,996,742 | 12/1976 | Goff | 60/422 |
| 4,051,766 | 10/1977 | Strauff | 91/417 R |
| 4,079,805 | 3/1978 | Rau | 180/132 |
| 4,410,193 | 10/1983 | Howard | 280/90 |
| 4,418,931 | 12/1983 | Howard | 280/90 |

FOREIGN PATENT DOCUMENTS

| | | |
|---|---|---|
| 908012 | 8/1972 | Canada . |
| 928934 | 6/1955 | Fed. Rep. of Germany . |
| 1047286 | 12/1953 | France . |
| 300453 | 9/1932 | Italy . |
| 354137 | 8/1931 | United Kingdom . |
| 798110 | 7/1958 | United Kingdom . |
| 1132497 | 11/1968 | United Kingdom . |
| 1237020 | 6/1971 | United Kingdom . |
| 1443676 | 7/1976 | United Kingdom . |
| 1490876 | 11/1977 | United Kingdom . |

Primary Examiner—Joseph F. Peters, Jr.
Assistant Examiner—Mitchell J. Hiu
Attorney, Agent, or Firm—Pollock, Vande Sande & Priddy

[57] ABSTRACT

A steering compensator for providing resistance to movement of a steering system away from a preselected center position until a steering force exceeds a preselected value which may be varied remotely while the vehicle is in operation. The preselected center position may also be varied remotely while the vehicle is in operation by a trim mechanism. The compensator may be rotary or linear and the resistance force may be provided by a variable spring force and/or a variable magnetic force. Optional features include a liquid system for viscous dampening and an undercut seat and cam arrangement for centering without significant slack or overshoot.

36 Claims, 20 Drawing Figures

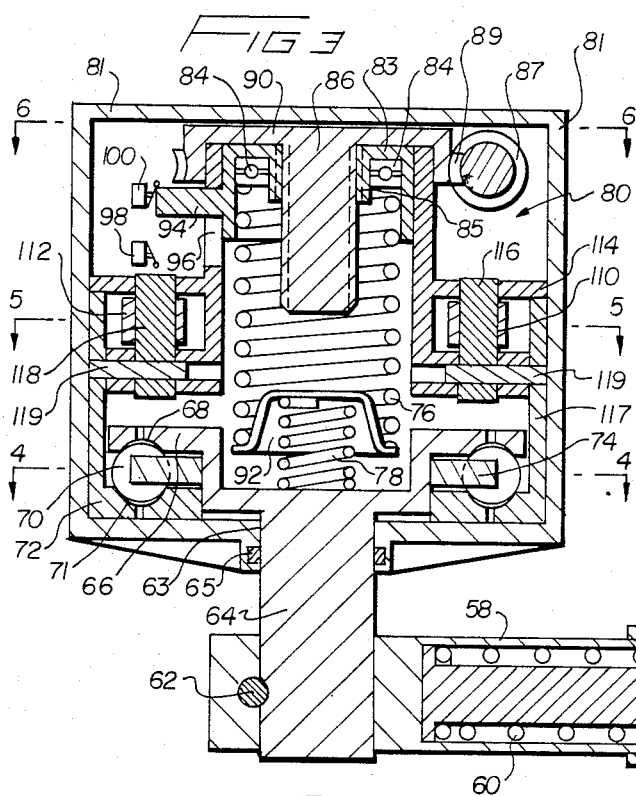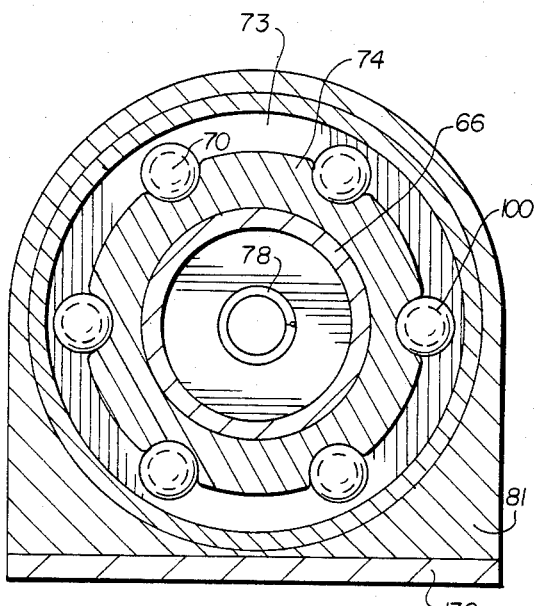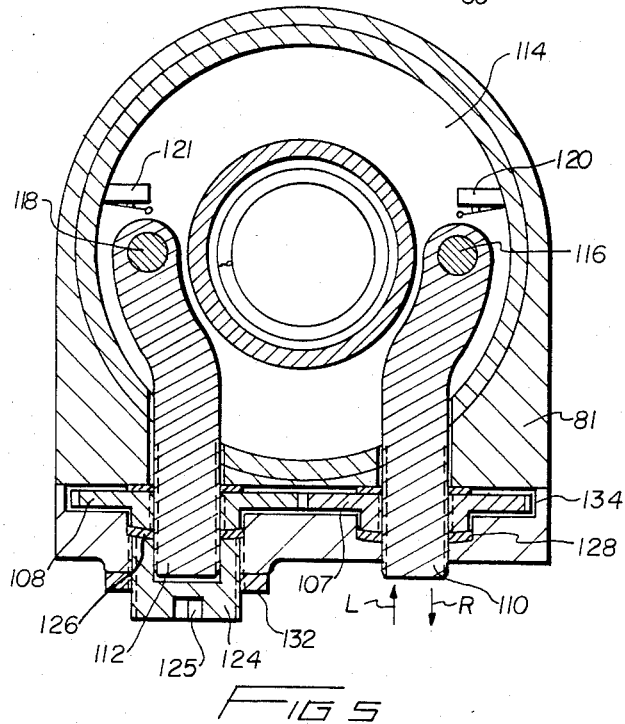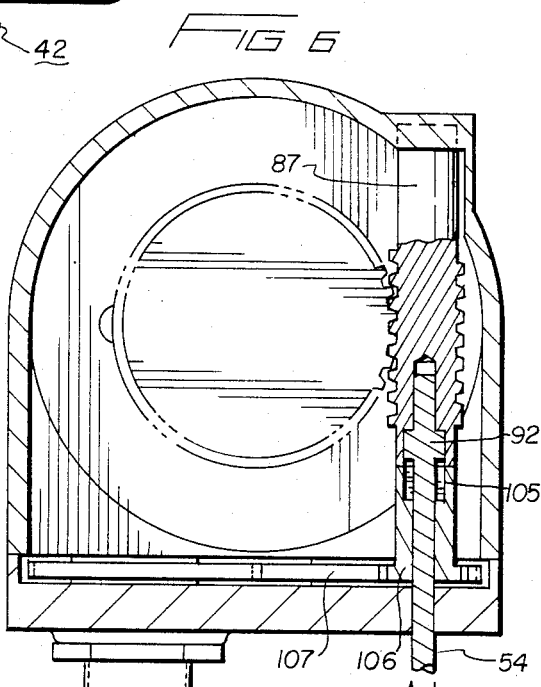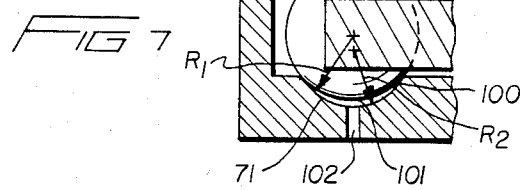

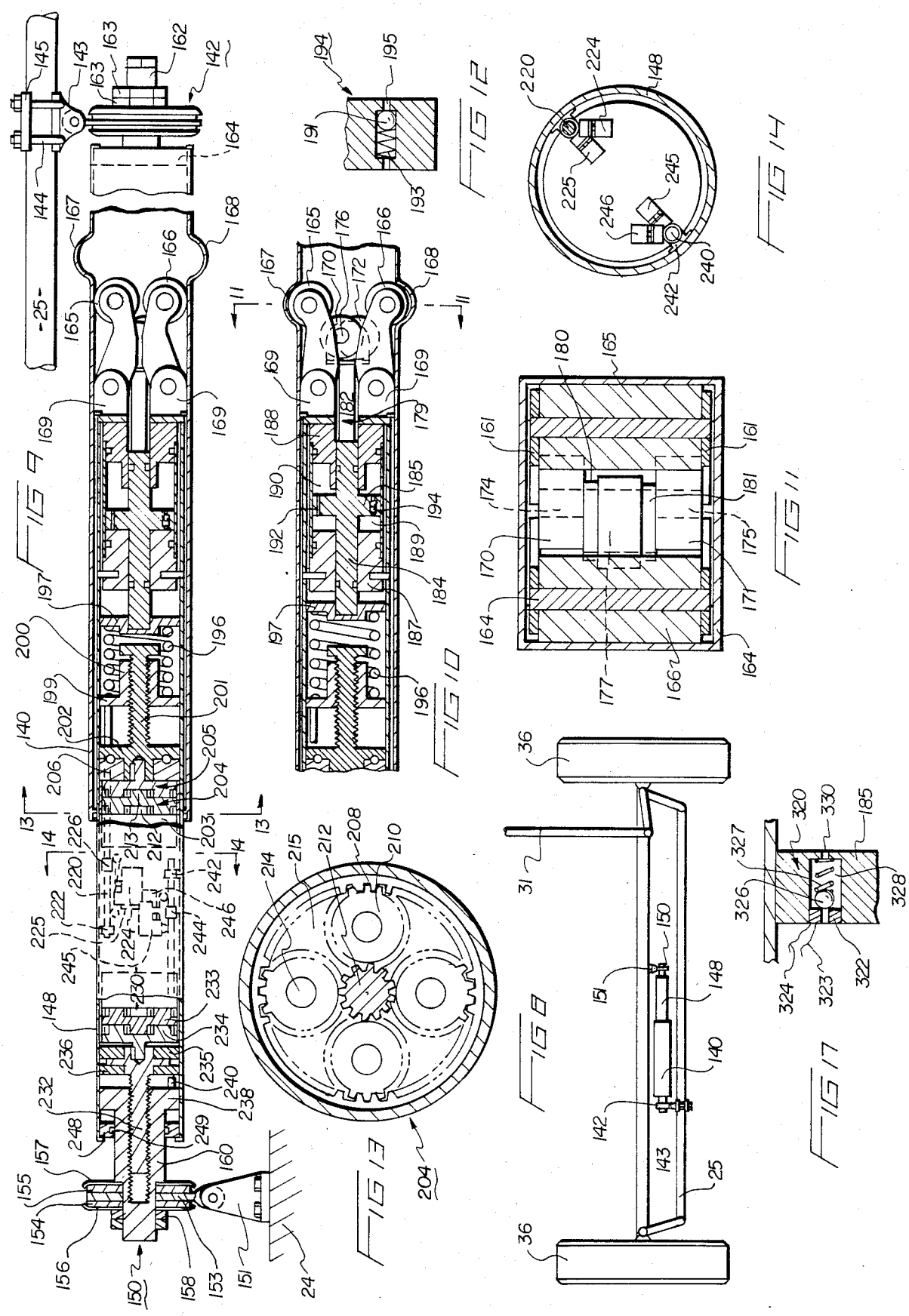

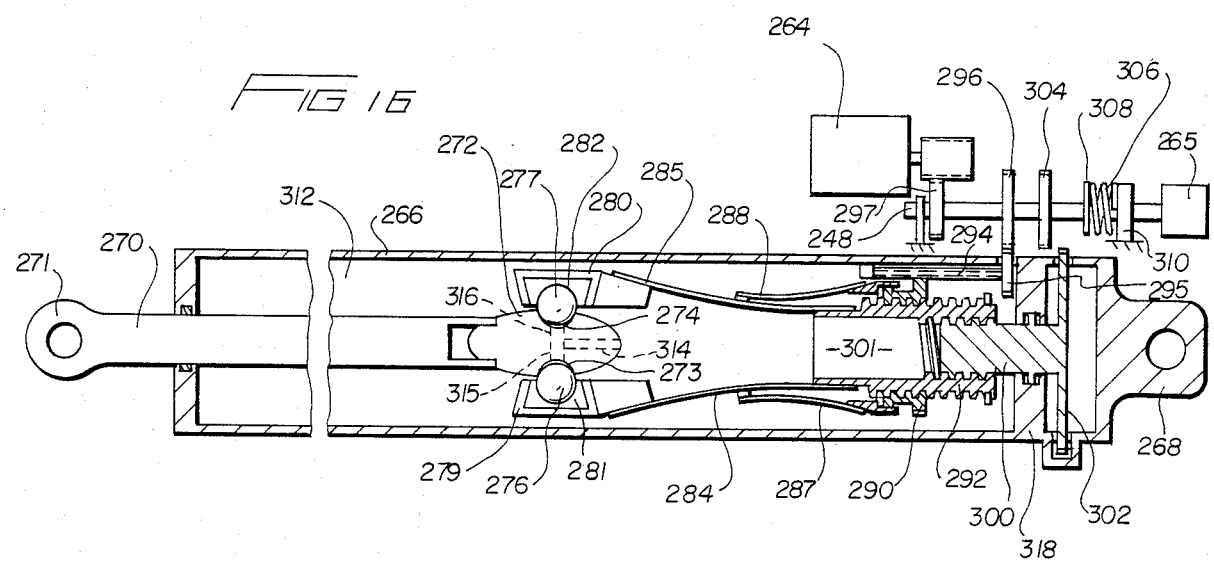

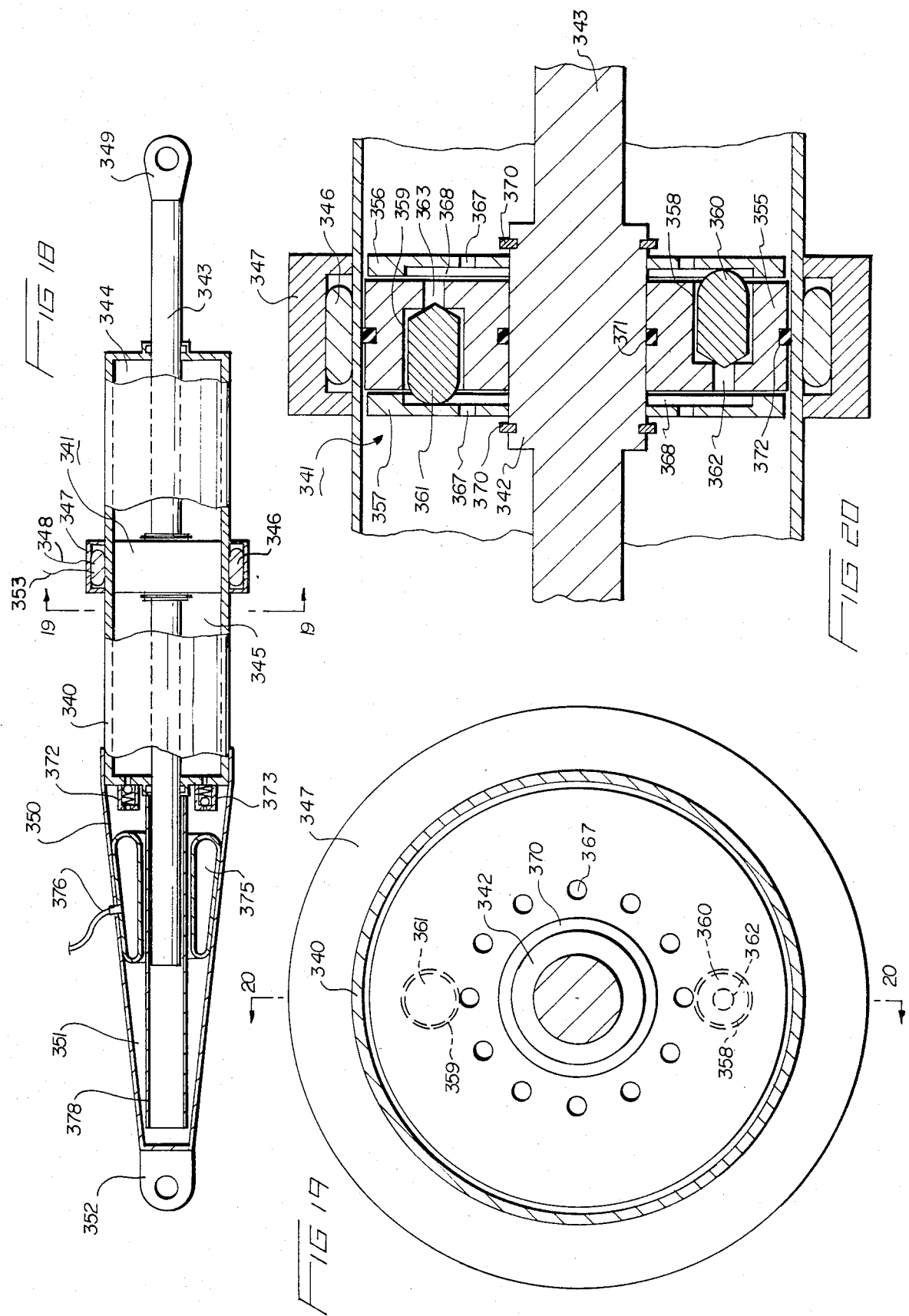

2

REMOTELY ADJUSTABLE STEERING COMPENSATOR

RELATED APPLICATIONS

The present application is a continuation-in-part of copending application Ser. No. 93,968, filed Nov. 14, 1979, now U.S. Pat. No. 4,410,193, and a continuation-in-part of copending application Ser. No. 296,617 filed Aug. 27, 1981, now U.S. Pat. No. 4,418,931, both by Durrell U. Howard, who is also the inventor of the present application. The entire contents of both of said copending applications are incorporated into the present application by reference.

TECHNICAL FIELD

This invention relates to vehicle steering systems and more particularly to a compensating device for keeping such systems in their center position in the absence of intentional steering inputs for turning the vehicle from its straight ahead path. The invention is especially useful as a centering device for highway vehicles, such as automobiles and trucks, having power steering systems.

BACKGROUND OF THE INVENTION

Steering systems for highway vehicles and the like are designed primarily for driver control. In these systems, the steering force required on the steering member and the ratio between steering member movement and movement of the steerable ground wheel takes into consideration the characteristics of the particular vehicle and the conditions under which it will usually be operated. A wide variety of forces can act on vehicle steering systems and these must be dealt with satisfactorily in order to provide a stable and controllable vehicle. As vehicle speed increases, the effects of any adverse steering inputs are multiplied, making it necessary for the driver to exercise more precise and careful driving control.

Vehicles with stable steering systems track relatively straight ahead and generally resist all steering inputs away from center, including those of the driver. Intentional turning maneuvers by the driver therefore require sufficient turning force to overcome this positive resistance to movement away from center. When the driver relaxes the turning force applied to the steering wheel, a stable system has a strong tendency to return to its straight ahead position and normally does not overshoot the neutral or center position. By contrast, an unstable steering system provides relatively weak or no positive resistance to movement away from center and may overshoot and sometimes oscillate about the center position. Therefore, with an unstable system, a straight, unswerving vehicle track can be maintained only by constant driver control through precision steering inputs to the steering system. A considerable amount of driver attention usually is required to keep the less stable vehicle tracking straight because forces of many different magnitudes and types can product spurious steering inputs into the vehicle steering system.

Some examples of less stable steering systems include standard highway-type vehicles with little or no positive caster or overpowered steering systems and various types of motor vehicles using offset wheels and/or oversized tires. Overpowered steering systems override any resistance or centering forces so strongly that driver feel for the center position is virtually eliminated. Zero or negative caster deprives the steering system of the centering forces discussed below with regard to positive caster. The destabilizing effects of offset wheels and/or oversized tires involve a more complex interaction of forces. Offset wheels are offset from the pivotal wheel mounting at the kingpin and can produce turning moments about the kingpin. Road forces acting along the outer portions of the extra-wide tread of oversized tires can also generate turning moments about the kingpin. These turning moments can lead to instability by dramatically multiplying any force tending to turn the steerable wheels away from center. Furthermore, offset wheels sometimes have a tendency to turn away from center without driver input, a tendency which can be aggravated by either positive or negative wheel caster. Since these destabilizing forces are magnified by speed, vehicle steering with offset wheels and/or oversized tires can be extremely difficult and actually unsafe at highway speeds.

The ideal situation is one where the steering system inherently causes the vehicle to travel in an unserving straight line unless the driver intentionally turns the vehicle in another direction. Thus, stable steering systems require relatively little attention from the driver as the vehicle progresses along a straight path down the roadway. In other words, from a steering standpoint, the stable vehicle should not respond to anything but the driver's steering commands and those commands must be of sufficient magnitude to overcome a significant resistance to turning away from center. In the absence of a steering input by the driver, the vehicle should literally do nothing but progress straight ahead.

In the past, vehicles that were inherently stable usually employed a generous positive caster, among other things, to achieve straight or true track characteristics. While positive caster is desirable in some respects, it is not without compromise over the full steering spectrum. For example, the adverse effects of strong, gusty crosswinds are usually more pronounced on vehicles with positive caster. As its name would imply, the vehicle tends to caster toward the side it is being push by the wind. Similarly, a high crown at the center of the roadway will cause vehicles to caster toward the edge of the roadway, that is, in the downhill direction from the crown. In addition, generous positive caster provides significant resistance to small radius turns and can make city driving quite fatiguing. These three adverse effects are some of the negative features of achieving steering stability through generous amounts of positive caster. On the plus side, except under the foregoing conditions or where offset wheels are used, motor vehicles with positive caster are less fatiguing to drive over long distances and are safer and more controllable at highway speeds. On reason such vehicles are more controllable is that by tracking straight, virtually no driver effort is required to keep the vehicle from swerving unless one of the foregoing extraneous forces are present.

In marked contrast, weak or soft centering systems, such as those employing little or no positive caster, excessive power steering, and/or offset wheels, change direction almost continuously so that constant driver manipulation is required for straight tracking of the vehicle. This kind of steering uses up more of the driver's energy than is generally realized and makes a long drive much more fatiguing. Such weak systems are also more susceptible to unintentional driver steering inputs, such as unstable driver-induced oscillations. Single car accidents have been caused by such adverse driver inputs simply because the overly soft directional stability of the vehicle was not sufficient to resist an upset steering input initiated unintentionally by the driver.

In an attempt to overcome some of the problems discussed above, Henry-Biabaud U.S. Pat. Nos. 3,171,298 of Mar. 2, 1965, 3,373,631 of Mar. 19, 1968, and 3,426,612 of Feb. 11, 1979, and Brueder U.S. Pat. No. 3,183,992 of May 18, 1965, suggest that a cam mechanism may be mounted directly on the steering column to help center the steering wheel. Because such a system is located on the steering wheel side of the steering gear assembly, spurious steering inputs from the steering column and/or from a power steering unit are magnified before reaching the steerable wheels by a factor corresponding to the vehicle steering ratio, which may be as large as 18:1 or greater. As a result, relatively weak spurious inputs can be transformed into strong wheel turning forces which may adversely affect the stability of the vehicle. One such spurious input is that generated when a steering wheel overshoots its center position as discussed in the latter two Henry-Biabaud patents referenced above. Another drawback of prior art centering devices resides in the absence of a means for the driver to quickly and easily change the resistance of the steering system to away from center movement in response to varying road conditions and changes in vehicle steering characteristics, which can vary greatly with vehicle speed.

A still further drawback of such prior art devices is that spurious forces transmitted from the roadway through the steerable wheels affect substantially the entire steering assembly before encountering any stabilizing resistance from either the steering wheel or a steering column centering device. The transmission of these spurious forces between the steerable wheels and the steering wheel cause the inter-connecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of unstable vehicle oscillations.

DISCLOSURE OF THE INVENTION

To properly compensate for various steering forces that may be encountered during operation of a vehicle, the centering compensator of the present invention has the following features:

(a) Resistance to initiation of turning movement away from either side of a preselected center position, the amount of resistance being sufficiently large to prevent turning movements in response to spurious inputs from either the steerable wheels or the steering column side of the compensator but sufficiently small to allow intentionally created turning inputs to be transmitted to the vehicle's steerable wheels or other steerable member.

(b) Remotely operated turning resistance permitting the driver to selectively activate and/or vary the amount of resistance force while the vehicle is in operation so as to satisfy driver preferences and/or compensate for changes in road conditions and/or steering system characteristics.

(c) Remotely operated trimming permitting the driver to selectively vary the preselected center position while the vehicle is in operation so as to compensate for changes in steering characteristics due to variations in the level or direction of extraneous forces tending to cause spurious off-center movement of the vehicle.

(d) Precision centering with no substantial overshoot past center when the steering system returns to a preselected center position.

(e) Turning resistance through a predetermined range of turning movement to either side of a preselected center position.

(f) Free return to the center position from either side of center.

(g) Fail-safe mode rendering the centering compensator inoperative so that it in no way affects movement of the steering system if the vehicle's power steering unit has failed or is otherwise inoperative.

(h) Precision centering independent of mechanical slack in the reduction gear, power steering unit, and/or other steering system components between the tie rod and steering wheel of a motor vehicle.

(i) Slack free trimming of center position.

(j) Viscous dampening of steering movements.

(k) Backfits existing vehicles.

(l) Requires relatively little space for installation.

(m) Provides centering for vehicles with or without power steering systems.

It is therefore a principal object of the present invention to eliminate unintentional steering inputs to a vehicle steering system and thereby reduce considerably the driver inputs required to maintain a straight ahead course for the vehicle. To accomplish this, the present invention off-sets spurious steering forces with an opposing resistance force sufficient to keep the steerable wheels or other steerable member in the center position for maintaining straight ahead vehicular travel. The invention comprises a centering compensator having a center position corresponding generally to the center position of the steering system. However, the center position of the compensator is remotely adjustable to permit the driver of the vehicle to change and reset the center position of the steerable member to compensate for new or changed steering forces that would otherwise cause the vehicle to deviate from its straight ahead course. Such changes in the center position of the steering system may be necessitated by component wear or changes in the forces acting upon the vehicle such as those caused by environmental conditions or by the conditions of the roadway. Even a change of tires can cause a change in the true center position. Remote adjustment permits the center position maintained by the compensator to be changed while the vehicle is in operation from a location that is "remote" relative to the location at which the compensator is connected to the steering system of the vehicle.

The present invention also provides a remotely adjustable level of resistance opposing initiation of off-center steering movement. This adjustment provides for different levels of steering force to initiate or breakaway into a steering movement away from center. This level of force is sometimes referred to in this specification as the "break away" force or resistance. Different levels of break away force may be appropriate to compensate for different steering system characteristics on the same or different types of vehicles and/or for changes in the forces acting upon the vehicle. The invention is also capable of generating sufficient compensating forces to properly control steering with offset wheels having oversized tires.

The level of resistance to movement away from center may be remotely adjusted either by a control mechanism operable by the driver or by a speed control mechanism responsive to the speed of the vehicle. Because of the large turning angles needed for city driving, it is preferable that the level of turning resistance be substantially zero or relatively low at speeds of 35 mph or less, e.g. 0–20 pounds at the tie rod. On the other hand, at highway speeds above 35 mph, it has been found to be less fatiguing to have relatively high level of turning resistance, e.g. 20–150 pounds at the tie rod at small turning angles away from center, preferably 0°–5°, more preferably 0°–3°, and most preferably within one degree on either side of center. For these purposes, the turning resistance of the present invention is readily adjustable to provide a low level at low speeds and a high level at speeds of about 35 mph or greater. In this regard, the centering compensator is much less complex than prior art arrangements, such as those which combine high positive caster near the center position and complex power steering systems for varying the level of power assist from a low assist level at small turning angles to a high assist level at large turning angles.

When connected to weak or soft steering systems, the invention provides the driver with a positive touch control not heretofore attainable with these types of systems. There is a distinctive feel when approaching or in the center position. Thus, the sense of touch is added to the visual sense to aid control of the vehicle and reduce driver fatigue, and positive stability is provided for previously unstable steering systems.

The preferred embodiments of the invention have the features (a) through (m) listed above, namely, resistance to steering movement away from center sufficient to overcome spurious steering inputs; remotely variable level of turning resistance through a predetermined range of turning movement; remotely trimmable center position; no substantial overshoot; free return to center position; fail-safe mode for disabling the compensator in absence of power steering; precision and slack-free centering; slack free trimming; viscous dampening; compact size; and utility for old and new vehicles with or without power steering.

Although the present invention is particularly useful as a centering mechanism for motor vehicles, it can be employed to position any steerable member movable to either side of a preselected position. For example, the compensator can keep an outboard motor centered so that a boat follows a straight course over the water in the presence of spurious steering forces produced by wind and wave action. The compensator can also be used to center such steerable members as the rudders of ships or airplanes and the tongues of tandem trailers or railway cars. The invention is usable with both powered and non-powered steering systems, the level of compensating forces provided usually being less in compensators for vehicles without power steering.

The invention may be used with steering systems having a reduction gear between the steerable member and a steering member. These compensators are connected to the steering system at a location between the steerable member and the reduction gear so as to be unaffected by any slack in the reduction gear or in components and connections between the reduction gear and the steering member.

The centering unit of the compensator is connected between the steering system and an axle or other frame member of the vehicle in a position that allows the steerable member to move through its full range of steering movements while providing sufficient leverage for the compensator to resist movement of the steerable member away from the center position producing straight ahead travel of the vehicle. The steering system connection may be made to any steering system component providing appropriate range and leverage, such as the tie rod which joins the front steerable wheels of a highway vehicle. The frame connection may be made to any component serving as a fixed mounting relative to the steering system and this component may be a fixed axle or some other part carried by the vehicle frame instead of an actual frame member.

The compensator has a detent member with at least one centering depression and at least one follower member arranged to contact opposite sides of the centering depression when the steerable member is in its preselected position. Either the follower member or the detent member is connected to the steerable member and the other of these members is connected to the frame of the vehicle so that the follower member and the detent member move relative to each other in response to movement of the steerable member away from its preselected position. In several embodiments, a compressed spring is arranged to press together the follower member and the detent member so that contact pressure between the follower member and the centering depression resists relative movement between the follower member and the detent member. Because these members are arranged between the steerable member and the frame of the vehicle, resistance to relative movement between these members prevents substantial movement of the steerable member away from its preselected position until the steering force applied to the steering system exceeds a predetermined value corresponding to the level of resistance provided by the contact pressure between the follower member and the centering depression.

In one embodiment of the compensator, the follower member and the detent member are arranged for rotary movement relative to each other. In this rotary embodiment, the follower member includes a plurality of rollers in spaced relation to each other and a disc like separator retains these rollers in spaced relation to each other. A detent member having a plurality of centering depressions is arranged relative to the follower member and roller retainer so that one of the rollers is received in each of the centering depressions which have a spaced relation corresponding to the spaced relation of the rollers.

The follower rollers are pressed into the centering depressions of the detent disc by means of a pressure disc which is engaged by a coil spring. The compression of the coil spring and thereby the contact pressure between the follower members and the detent disc is varied by varying the distance between a retainer cup for this spring and the pressure disc. To provide this movement of the pressure disc, it is threadingly engaged by a jack screw which has an annular rack rotatably engaged by a worm gear type pinion. To provide no-slack centering in both this and the subsequent embodiments described, the radius of the follower rollers is substantially greater than the corresponding radius of each centering depression.

For purposes of providing viscous dampening of initial movement between the detent disc and the pressure disc, and thereby viscous dampening of initial away from center movement of the steering system, the compensator housing is filled with liquid and a metering aperture is provided in fluid communication with each centering depression. Sealing engagement between each follower roller and its seat within a corresponding centering depression is also provided so that relative movement of the follower rollers causes liquid to flow through the apertures between a reservoir volume in the housing and a fluid pocket in the centering depressions.

The rotary embodiment also includes a trim mechanism for varying the preselected position of the steerable member while the vehicle is in operation. The detent plate and the pressure plate with the follower members therebetween comprise part of a linkage for connecting the resistance mechanism to the vehicle frame at a first point of connection and to the steering system at a second point of connection in spaced relation to the first point of connection. The spaced relation provided by this linkage defines a center distance when the steerable member is in its preselected position. A drive assembly is arranged to selectively vary the centered distance by changing the position of the detent disc relative to the housing which mounts this disc and the other compensator components on the frame of the vehicle. Angular adjustment of the detent plate moves the seated follower rollers by a similar amount which in turn moves the pressure disc so as to change the distance between the point at which the housing is connected to the frame and the point in which a linkage attached to the pressure disc is connected to the tie rod or other component of the steering system, these connection points defining the centered distance. It is of course possible to reverse these connections so that the compensator housing is connected to the steering system and the outer end of the linkage is connected to the frame.

The trim mechanism for the rotary embodiment also includes several features of particular interest. The detent disc is carried by a carriage which is driven for rotary trimming adjustment by opposing screws pivotally connected at opposite sides of the disc-like carriage. A projecting, threaded end of each screw is in turn engaged by a gear. The gears for the respective screws rotate in opposite directions so that when the gear train is driven by a common power source, one screw member is pushed while the other screw member is pulled so as to rotate the carriage and the detent plate carried thereon. An adjustable thrust bearing engages one gear and screw so as to force the opposite gear and screw against a fixed thrust bearing and thereby remove any mechanical slack from the pivotal points of the screws and from the engagement between screws and gears.

While separate motors may be used for the trimming mechanism and for the resistance force mechanism, the rotary embodiment preferably uses a single motor with a shifting mechanism to direct motive power to the trimming mechanism and to the force mechanism, respectively. Thus, an axially movable drive rod is arranged to engage a drive train for adjusting the spring force and has a second or shifted position at which it is disconnected from the spring force drive train and engages a second drive train for adjusting the trimming mechanism.

In order to fit within a small space, the rotary compensator has a relatively compact structure and includes a telescoping connecting linkage between the pressure plate and the steering system. This telescopic linkage has an extensible arm which allows for full movement of the tie rod as the steerable wheels turn through about 90° of arc (45° to either side of center). The extensible arm is spring biased toward its retracted position and is extended only as needed to follow the last portion of tie rod travel during a large angle turn. The telescopic linkage is arranged relative to the pressure plate so that the extensible arm stays in its retracted position until after the follower members have collectively rolled out of their corresponding centering depression so as to be entirely disengaged therefrom. This arrangement ensures that full contact pressure between the followers and the depressions is available for resisting movement of the steering member and will not instead be dissipated partially or completely by premature movement of the extensible arm. After the followers have left their respective depressions, they no longer resist off-center movement and the extensible arm may then be extended without affecting the level of off-center resistance. In other words, off-center resistance is available only through a predetermined distance to either side of center, i.e., the distance required to move the followers out of their respective depressions. In the preferred embodiment, this predetermined distance through which off-center resistance is provided by the steering compensator is equivalent to a turning angle of less than 15°, preferably less than 10° and more preferably less than 5°, to either side of center.

In a second embodiment of the invention, the follower members and the detent member are arranged for linear movement relative to each other. In this linear embodiment, the detent member comprises a casing and the follower members comprise a pair of rollers carried by a tubular housing arranged for linear telescopic movement within the casing. The follower rollers are arranged to engage a pair of centering depressions in the casing when the steerable member is in its centered position. The assembly further includes at least two pressure rollers, one in contact with each follower roller. The pressure rollers are mounted for rotation on separate journals of an axle member and the rotational axes of the pressure rollers are radially offset from each other so that one of the pressure rollers is in contact with one of the follower rollers and the other pressure roller is in contact with the other follower roller. The pressure rollers thus do not interfere with each other and each is free to rotate in firm contact with its corresponding follower roller.

The pressure rollers bias the follower rollers so that the follower rollers are pressed into the centering depressions of the casing and it is this contact pressure that resists relative movement between the casing and the tubular housing. The bias is provided by a spring biased piston member carried in a pressure cylinder mounted within the tubular housing. The pressure cylinder contains a liquid for providing viscous dampening of the piston member. The piston member biases the pressure rollers against the follower rollers and for this purpose is engaged by a coil spring mounted within an adjustable retaining cup. Movement of this cup varies spring compression and thereby varies the contact pressure transmitted to the follower rollers. The spring retaining cup is moved along the axis of the spring coil by means of a jack screw rotated through a reduction gear by an electric motor. The electric motor is remotely operated from the driver's station of the vehicle so as to selectively vary the spring compression and thereby the amount of contact pressure resisting away from center movement of the steerable member.

The cross-sectional shape of the casing may be either square or circular, depending upon the shape of the follower rollers. Thus, the casing may comprise a rectangular box where the rollers are substantially cylindrical in shape, and may have centering depressions in opposite walls of the casing. As an alternative, the casing may be a cylindrical tube of larger diameter than the cylindrical tube of the inner telescopic housing. Where the casing is cylindrical, the follower rollers may be oblong or of the ball type and a single annular centering depression may extend around the transverse periphery of the casing so that a common centering depression is provided for the two follower rollers. The rollers may then take any radial orientation relative to this common depression.

In this linear embodiment, the piston has an orifice for metering flow to provide viscous dampening during initial away from center movement of the follower rollers relative to their corresponding centering depressions. The piston also houses a check valve for providing free return of the follower rollers to their centered position within the centering depressions.

The linear compensator also includes a trim means remotely operable for varying the preselected position of the steerable member while the vehicle is in operation. This trim mechanism comprises a connecting linkage for connecting the resistance mechanism to a vehicle frame at a first point of connection and to the steering system at a second point of connection in spaced relation to the first point of connection, this spaced relation defining a centered distance when the steerable member is in its preselected position. The linkage includes a second jack screw threadingly engaging an extensible linkage member. The jack screw is driven by a second electric motor through a second reduction gear so that rotation of the jack screw relative to the extensible member causes the linkage to vary the centered distance and thereby the preselected position of the steerable member. A control means is provided for remotely operating the trim motor so as to selectively vary the centered distance while the vehicle is in operation.

In a second linear embodiment (third embodiment of the invention), contact pressure between the follower members and the detent member is provided by a pair of leaf springs instead of a coiled compression spring. In this embodiment, the detent member has an egg-like shape so that contact pressure between the detent member and the follower members decreases when off-center movement continues after the follower members have left their centering depressions. Contact pressure is adjustable by relative axial movement between stiffening members and each leaf spring. Trimming movement is provided by axial movement of the leaf springs which have retainers carrying the follower members at the outer ends thereof. Motor driven spline and gear members provide the desired spring force adjustments and/or trimming adjustments.

In this second linear compensator, viscous dampening may be provided by filling the cylinder with liquid and employing metering passageways within the egg-like detent member so that fluid can flow between a reservoir volume and a pocket in the center depression beneath each follower member.

Embodiments 1-3 include a feature for eliminating mechanical slack in the interaction between each follower member and its corresponding centering depression. This slack-removal feature comprises a follower member with a radius of curvature that is larger than the radius of curvature of the centering depression such that contact between the follower member and the centering depression will occur only along a narrow rim portion of the centering depression. In other words, the centering depression is "under-cut" relative to the diameter of the follower. Where the transition between the centering depression and the adjacent surface of the detent member is relatively sharp, the rim portion along which contact pressure occurs between the follower and the depression comprises a relatively sharp apex at the juncture between the depression and the surrounding surface. However, the rim preferably comprises a narrow band of either flat or convex (rounded) transition surface forming a seat of definite width for the follower member so as to minimize wear at the rim of the centering depression. Where the rim is relatively sharp, repeated travel of the follower member over the rim may wear off the sharp edge in an uneven manner, resulting in intermittent bands of contact separated by areas of no contact. In each of these alternatives, contact between each follower member and the rim of its corresponding depression occurs along substantially a line of contact.

The invention also contemplates that the resistance force provided by a spring member may be supplemented or replaced by a magnetic resistance force. In the rotary embodiment, an electromatic coil may be positioned around the housing in spaced relation to the pressure and detent discs so as to create a magnetic attraction between these two discs and thereby increase the contact pressure in the follower members sandwiched therebetween. With respect to the first linear embodiment, the off-center resistance provided by a coil spring may be supplemented by combining a magnetic relief valve with a metering orifice that provides viscous dampening of initial off-center movement. A principal advantage of magnetic resistance force is that it can be varied by varying the amount of current passed through an electro-magnetic coil.

The invention further contemplates that resistance to away from center movement may be provided entirely by a specially designed magnetic piston that constitutes a fourth embodiment of the present invention. The features of this embodiment may also be incorporated into the linear compensator by substituting the magnetic piston for the apertured piston of the first linear embodiment.

The magnetic piston compensator comprises a valved piston assembly arranged for reciprocal movement within a pressure cylinder for holding a liquid. When the piston is in its centered position, it is within the influence of a magnetic coil carried by the cylinder. The piston includes two valve members, one arranged to resist fluid flow in a direction opposite to the other. Each valve member is held on its seat within a core disc by a corresponding armature disc of magnetic material on either side of the core disc. When the piston is in the magnetic flux generated by the coil, magnetic attraction between the core disc and the respective armature discs holds the valve members against their seats, the level of contact pressure corresponding to the amount of magnetic flux.

Movement of the piston member in either direction requires unseating the corresponding valve member with a fluid pressure differential greater than the magnetic force holding the valve in its seated or closed position. When this differential pressure is reached in response to a steering force, the valve then opens and allows fluid to flow through passageways in the piston. This fluid flow in turn permits movement of the piston away from its centered position. As soon as the piston leaves the magnetic field of the coil, it is then free to move in either direction without further off-center resistance being provided by the valve members. However, the passageways through the piston are sized so as to provide viscous dampening of away from center movement for the purposes previously described in relation to the other embodiments.

The housing of the magnetic piston compensator includes an extension forming a fluid reservoir to which fluid may be released upon overpressure of the fluid cylinder due to thermal expansion as a result of increased temperatures and the like. A check valve lets fluid return to the pressure cylinder when pressure in the cylinder falls below that in the reservoir. An air bag may be provided in the reservoir to maintain back pressure on the reservoir fluid so as to keep the pressure cylinder filled with liquid.

The magnetic piston compensator prevents substantial movement of the steerable member away from its preselected position until the steering force exceeds a value predetermined by the amount of magnetic force corresponding to the level of coil current selected. Since the amount of magnetic force may be varied by selectively varying the level of current through the coil, the resistance to away from center movement provided by this embodiment is also variable. The trim mechanisms of the other linear embodiments may be used to provide trimming movement of the pressure cylinder relative to the frame upon which it is mounted so as to vary the preselected center position of the steerable member.

All embodiments of the compensator may include means for remotely and selectively varying both the amount of resistance to movement away from center and the preselected position of the steerable member relative to the vehicle frame. Both of these remote adjustments can be made by the driver while the vehicle is in operation. An electrical control system is employed for operating various adjusting motors of the reversible type, and the switches for actuating these motors are preferably located at the driver's station of the vehicle. The switches preferably have a toggle that is biased by spring to the circuit opening position. These types of switches are closed only momentarily when the toggle is held in a depressed position against the spring bias. Thus, the adjusting motors are actuated only while the toggle is actually depressed. Release of the toggle opens the circuit and stops the adjustment at the point selected. While separate motors may be employed for operating the trim adjusting mechanism and the resistance force adjusting mechanism, a single motor may be used in combination with a solenoid shifting mechanism for selectively engaging the trim adjusting mechanism in one position and the force adjusting mechanism in a second position.

Limit switches are preferably provided to limit both the range of trimming movement and the range of resistance force. Where the vehicle steering system includes a power steering or power assist assembly, the controls further include a circuit for activating the resistance force motor until it reaches a position removing substantially all compensator resistance to away from center movement of the steering system. Should a power steering failure involve engine failure, power for releasing the resistance force may be derived from the storage battery of the vehicle. Where a magnetic pressure differential valve or piston is employed, a power steering failure need only deactivate the electrical circuit providing current to the electro-magnetic coil in order to remove all resistance to off-center movement.

Spurious steering forces which tend to move the tie rod of a motor vehicle in either direction are resisted by the steering compensators of the invention. Only when intentional steering forces provided by the driver exceed the preselected break away level of resistance provided by the compensator will the steering member move the steerable member(s) relative to the preselected center position. After movement is initiated, the steering force required to sustain movement is a function of the shape of the surface engaged by the follower member(s). Where a magnetic valve is involved, sustained movement away from center requires that sufficient steering force be maintained to provide the differential pressure needed to keep the valve open. Sustained movement also requires that the steering force overcome any return force that may be provided by centering phenomena acting on the steering system, such as positive wheel caster.

The centering return force provided by positive wheel caster follows a force curve that may provide relatively little, if any, turning resistance in the straight ahead position or at small angles of turn immediately adjacent to the straight ahead position. The follower and centering depression of the present invention are sized and shaped or "cut" so as to provide a resistance force which blends with any return force provided by the normal geometry of the front end of a motor vehicle. The invention can increase substantially the turning resistance available at and immediately adjacent to either side of the straight ahead position of the steerable wheels. At greater turning angles, the resistance force provided by the invention preferably tapers off as positive caster return force increases.

The turning resistance provided by the invention at or near the centered wheel position should be sufficiently large to resist spurious steering inputs generated either by the driver or by an overactive power steering system. In a preferred embodiment, the shape of the centering depression and other compensator parameters are chosen so that a total break away steering force of at least 20 pounds, preferably at least 50 pounds, and more preferably at least 70 pounds must be applied to the tie rod in order to initiate break away turning movement of the steerable wheels at vehicle speeds above about 35 miles per hour. For city driving at vehicle speeds of about 35 miles per hour or less, the break away force required is preferably lowered to below about 20 pounds, more preferably below about 10 pounds, at the tie rod.

It is of course possible to provide higher levels of caster return force at and near the center position, but such levels of positive caster make driving in the city very fatiguing because of the necessity of frequently turning the vehicle through large turning angles. Although such high levels of caster can be overcome by increasing the level of power steering, such variable level power steering systems are complex and significantly increase the cost of the steering assembly.

Where steerable wheels are provided with positive caster, which is usually the case with highway motor vehicles, the surfaces on which the follower members ride adjacent to the centering depressions are shaped to form a neutral cam surface which provides no further turning resistance. In other words, interaction between a follower member and its corresponding depression in the detent member provides a decreasing level of resistance force at the steerable wheels move away from center, until the caster return force, which increases in proportion to turning angle with positive caster, is of sufficient magnitude to alone provide stabilizing resistance. The resistance force need not go to zero, but instead the shape of the camming surfaces adjacent to the depressions may provide a resistance force effective over the entire range of turning angles, which for highway vehicles is usually limited to 45° on either side of the straight ahead position (the "0°" position). Preferably, there should be sufficient positive caster for the resistance force to be effective over the range of 0°-15°, more preferably 0°-10° and most preferably 0°-5° on either side of center.

With prior art devices connected directly to the steering column, such as those of Henry-Biabaud and Brueder, spurious wheel movements may be generated by interactions between the steerable wheels and the roadway because of slack in the steering system and, where used, because of dead space travel of the power steering valve before it opens the fluid ports of a power steering unit. The compensator of the present invention resists such spurious wheel movements and prevents such spurious inputs from reaching the steering gear and other steering components located between the tie rod and the steering wheel because the compensator is located downstream of the steering gear on the slow side of its ratio. The steerable wheels are therefore maintained in their straight ahead position irrespective of any spurious inputs or mechanical slack that may be present in the upstream, fast ratio portion of the steering assembly. In the absence of the present invention, such spurious inputs to and/or mechanical slack in the steering assembly require almost constant manipulation of the steering wheel by the driver and make it almost impossible to hold the vehicle on a true straight ahead course.

Furthermore, the point of connection relative to the steering gear, the shape of the centering depression and the variable resistance force are such that overrunning or overshooting of the centered, straight ahead position is avoided as the steering system returns to center. Thus, in addition to holding a weakly centered steering system at its center position, the invention provides positive restraint against movement past the center position when the steering system is returned to center from a turning movement to either side thereof.

The present invention is an improvement over that shown in copending applications Ser. No. 093,968 now U.S. Pat. No. 4,410,193 and Ser. No. 296,617 now U.S. Pat. No. 4,418,931 in that the mechanical components of the compensator are less complex and may therefore prove to be more reliable. In addition, the present invention eliminates any need for an external fluid system which may experience leakage at connections between fluid handling components.

BRIEF DESCRIPTION OF THE DRAWINGS

The invention, both as to its structure and operation, may be understood further by reference to the description below read in conjunction with the accompanying drawings in which:

FIG. 3 is an elevational view in section showing details of a rotary compensator according to the invention.

FIG. 4 is a plan view in section taken along lines 4—4 of FIG. 3.

FIG. 5 is a plan view in section taken along lines 5—5 of FIG. 3.

FIG. 6 is a plan view in section taken along lines 6—6 of FIG. 3.

FIG. 7 is a fragmentary sectional view showing details of a follower member relative to a centering depression.

FIG. 8 is a schematic diagram of a steering system illustrating installation of a linear compensator according to the invention between the steering system and a frame member of a motor vehicle.

FIG. 9 is a plan view in partial section showing details of a linear compensator according to the invention.

FIG. 10 is a plan view in fragmentary section of the linear compensator of FIG. 9 with the centering components in their centered position.

FIG. 11 is an elevational view in section taken along lines 11—11 of FIG. 10.

FIG. 12 is a fragmentary sectional view showing details of a check valve in the piston of the linear embodiment of FIGS. 9 and 10.

FIG. 13 is an elevational view in section taken along lines 13—13 of FIG. 9.

FIG. 14 is an elevational view in section taken along lines 14—14 of FIG. 9.

FIG. 15 is a schematic diagram of an electrical circuit for remotely operating the variable resistance mechanism and the trimming mechanism of the invention while a vehicle is in operation.

FIG. 16 is a plan view in section of a second linear embodiment of the invention.

FIG. 17 is a fragmentary sectional view illustrating details of a modification of the linear compensator of FIG. 9.

FIG. 18 is a plan view in partial section of a third linear embodiment of the invention.

FIG. 19 is an elevational view in section taken along lines 19—19 of FIG. 18.

FIG. 20 is an elevational view in section taken along lines 20—20 of FIG. 19.

BEST AND OTHER MODES FOR CARRYING OUT THE INVENTION

Figure 1:
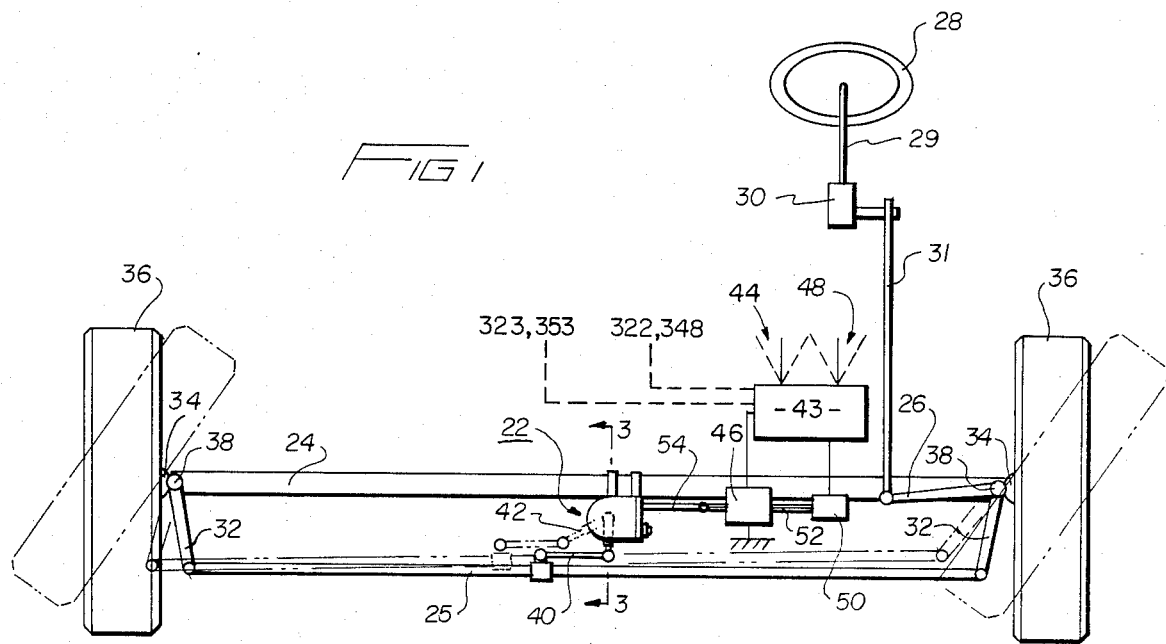
FIG. 1 is a schematic diagram of a steering system illustrating installation of a rotary compensator according to the invention between the steering system and a frame member of a motor vehicle.

Referring to FIG. 1, a rotary centering compenstor of the present invention comprises a center unit, generally designated 22, which may be connected between an axle 24 and a tie rod 25 of a conventional motor. Intentional steering inputs by a driver of the vehicle are transmitted to the tie rod through a steering rod 26 to a steering wheel 28 by means of a steering column 29, a reduction gear 30 and steering linkage 31. The steering system components shown are conventional and may include bell cranks 32-32 carried by knuckles 34-34 which support steerable wheels 36-36 for pivotal turning movement about kingpins 38-38 carried by axle 24 or some other mounting member attached to the vehicle frame.

Centering unit 22 is connected to tie rod 25 by a connecting rod 40 and includes an extensible arm 42 having an internal mechanism for retracting the arm after it has been pulled out by a large angle turning movement away from center as illustrated by the dotted outline position of tie rod 25 and steerable wheels 36-36. The centered position of wheels 36-36 is represented by solid lines and this position is remotely adjustable by means of a control mechanism 43 having a toggle switch 44 connecting a source of electrical power to a reversible motor 46. Motor 46 may also be used to adjust the level of a resistance force provided by unit 22 to oppose away from center movement of wheels 36-36. This function is initiated by closure of a second switch 48 which actuates a shift solenoid 50 so as to axially shift a spline 52 and connect motor 46 through a drive rod 54 to a variable resistance force mechanism housed within centering unit 22 as described below.

The turning resistance provided by compensator 22 preferably blends with any forces tending to return wheels 36-36 to center, such as positive caster provided by the normal geometry of the front end of a motor vehicle. Positive caster return forces may be relatively low in the straight ahead position and increase exponentially with turning angle as shown by curve A in FIG. 2. In this figure, the supplemental resistance force provided by compensator 22 is represented by curve B and this additional level of resistance force tapers off as caster resistance increases at greater turning angles. The combined turning resistance provided by compensator 22 and positive caster is represented by curve C in FIG. 2. Preferably, there is sufficient positive caster so that the supplemental resistance force need be effective only over a relatively small range of about 0°-30°, more preferably 0°-10° and still more preferably 0°-5° on either side of center. The compensator parameters are chosen so that a total break-away steering force of at least 20 pounds, preferably at least 50 pounds, and more preferably at least 70 pounds, must be applied to tie rod 25 in order to initiate turning movement of wheels 36-36 at speeds above about 35 mph. In other words, when the caster resistance force, which increases in proportion to turning angle with positive caster, is of sufficient magnitude to alone provide stabilizing resistance to turning movement away from center, the resistance force provided by compensator 22 may go to 0.

Referring now to FIGS. 3 and 4, extensible arm 42 includes a telescopic rod 43 having an eye 56 for receiving a bolt (not shown) pivotally connecting arm 42 to connecting rod 40. Rod 43 is biased toward a retracted position within a connecting cylinder 58 by means of a coil spring 60. The retracting force provided by spring 60 preferably is of sufficient magnitude to keep rod 43 in its retracted position at turning angles within which a resistance force is provided by the compensator. These turning angles are preferably 5° or less, more preferably 10° or less, and still more preferably 15° or less. At turning angles greater than these minimums, rod 43 extends relative to cylinder 58 so as accommodate large turning angles as illustrated in FIG. 1.

Cylinder 58 is secured by a locking pin 62 to a resistance output shaft 64 carried by a follower disc 66. Follower disc 66 has a plurality of centering depressions 68 each of which is in contact with one side of a corresponding follower roller or ball 70. The side of each ball 70 is in contact with a centering depression 71 in a detent disc 72 arranged in opposed relation 66. As seen best in FIG. 4, a plurality of balls 70 are maintained in spaced relation to each other by means a ball retainer 74. Contact pressure between balls 70 discs 66 and 72 is provided by a primary spring 76 and a secondary spring 78. It is this contact pressure between balls 70 and centering depressions 68 and 71 of discs 66 and 72, respectively, that provides the resistance force opposing away from center turning movement of steerable wheels 36-36 as represented by curve B in FIG. 2. the resistance mechanism represented by the discs, follower balls and coil springs is enclosed within a chamber 80 defined by a housing 81.

Because of the contact pressure provided by springs 76 and and the interaction between balls of centering depressions 68 and 71, rotation of shaft 64 in either direction about its longitudinal axis resisted by the force required to roll all of the balls out of their centering depressions against the force of the springs. Because shaft 64 is directly connected to tie rod 25 by extensible arm 42 and connecting rod 40, tie rod is held in a predetermined position by this resistance force as long as the balls are seated in their centering depressions. By maintaining tie rod 25 in a predetermined position, attached wheels 36-36 are similarly restrained turning movement away from a corresponding predetermined position, preferably chosen to correspond to straight ahead movement of the vehicle.

Disc 66 is free to reciprocate together with output shaft 64 within housing aperture 63 having a seal 65. The pressure of springs 76 and 78 thus function to disc 66 toward disc 72 which forces balls 70 into surface contact with their corresponding centering depressions. When a steering force sufficient to overcome the force is applied over a large enough turning angle, disc 66 and shaft 64 reciprocate upward and balls 70 ride out of their centering depressions and onto adjacent surfaces of discs 66 and 72. The adjacent surfaces of disc 72 are designated 73 and shown in FIG. 4. Surfaces 73 and the corresponding surfaces of disc 66 (not shown) may be either inclined so as to continue to provide resistance force or horizontal so as to provide no resistance force while the balls are in contact with these surfaces.

The contact pressure provided by springs 76 and 78 may be selectively varied by changing the degree of compression of spring 76 and/or spring 78. The compression of these springs is regulated by a cup 83 which contains a thrust bearing 84 for engaging the upper end of spring 76 as shown best in FIG. 3. Cup 83 includes an internally threaded collar 85 which is engaged for axial movement by a jack screw 86. Screw 86 is rotated by a resistance force pinion 87 which engages the teeth of a rack 89 on the periphery of a cylindrical base 90 of the jack screw. Pinion 87 is rotated by drive rod 54 which in turn is driven by motor 46 as previously described. Drive rod 54 engages pinion 87 through a shiftable head 92 which may be released from engagement with pinion 87 by axially reciprocation of rod 54 in the direction of arrow T.

Rotation of rack 89 by pinion 87 causes spring cup 83 to reciprocate axially along jack screw 86 relative to pressure disc 66, thereby compressing or releasing spring 76 and/or spring 78. Spring 76 is less stiff than spring 78 so that spring 78 is not compressed until adjustable cup 83 approaches intermediate spring 92, at which point spring 76 is substantially fully compressed so that collar 85 has essentially bottomed out against the solid mass represented by this fully compressed spring. At this point, spring 78 is compressed until a stop pin 94 carried by cup 83 bottoms out against the bottom of a slot 96 in which it travels. Where drive motor 46 is of the positive drive type, a limit switch 98 is provided so as to cut off the motor when this switch is contacted by stop 94. Where motor 46 is of the slip clutch type, limit switch 98 may be omitted. An upper limit switch 100 may also be provided to cut off reversible motor 46 when adjustable cup 83 reaches the upper limit of its travel where substantially all spring pressure is released from disc 66.

The size and shape of the balls and the centering depressions and the contact pressure provided by the springs are chosen so as to provide the desired breakaway force previously described. By appropriately contouring the centering depressions, the resistance force generated need not go to 0, but instead may be effective over the entire range of turning angles, which for highway vehicles is usually limited to 45° on either side of the centered wheel position (the 0° position). In other words, although circular centering depressions are shown in the preferred embodiments for reasons given hereinafter, these depressions may have other shapes such as a sloped indentation from one end to the other so that the ball never leaves the depression and some turning resistance is always provided. The centering depressions may thus be shaped or "cut" so as to provide a supplemental resistance force which blends with any resistance force provided by the normal geometry of the front end of the vehicle, such as positive wheel caster.

Figure 2:
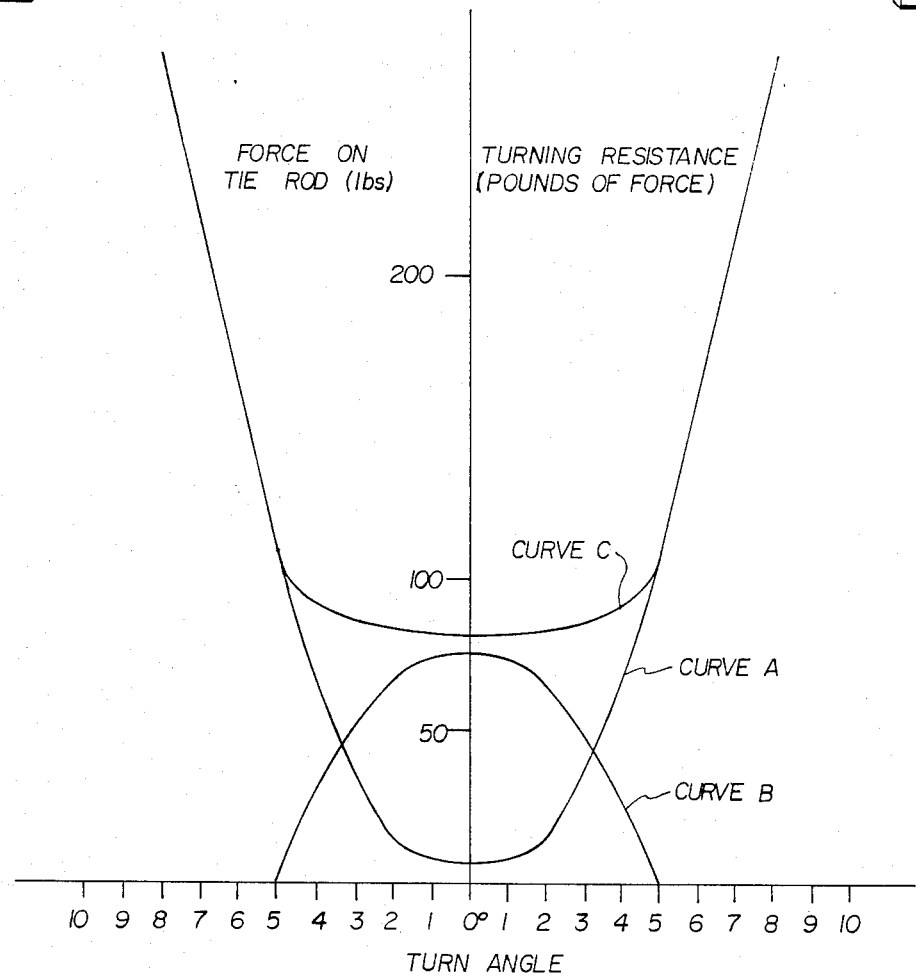
FIG. 2 is a curve plotting turning resistance opposing away from center movement of the vehicle wheels as a function of the angle of turn of the vehicle wheels from a predetermined center position.

The resistance force generated by interaction of follower balls 70 with centering depressions 68 and 71 is shown by Curve B appearing in the graph of FIG. 2. The graph gives the resistance force at the tie rod opposing turning of wheels 36-36 away from their straight ahead position as a function of the turning angle of these wheels. Curve A illustrates the resistance force generated by a typical positive wheel caster. It is apparent from this curve that the resistance force generated by such caster rises from a minimum value at dead center (0°) to maximum values which may exceed 500 pounds as the turning angle of the wheels approaches its maximum of about 45°. For small turning angles in the range of about 0°-2°, the resistance force generated by a positive caster is relatively small, often being no more than about 5-15 pounds. With such a small resistance force, spurious steering forces can easily deflect wheels 36-36 from their straight ahead positions and through a small spurious turning angle. At highway speeds, even small spurious turning angles or angles of deflection can easily lead to a vehicle leaving the roadway. Thus, where only positive caster is present, the vehicle driver must frequently provide compensating steering forces in order to counteract such spurious steering forces and maintain the vehicle proceeding along a straight ahead path.

Curve B illustrates the resistance force provided by compensator 22 through the interaction between rollers 70 and the opposing center depressions of discs 66 and 72. When wheels 36 are in their straight ahead positions, the resistance force provided by the compensator has a maximum illustrated value of about 75 pounds. When this resistance force is added to the positive caster resistance force at a 0° turning angle, the resultant force level of at least about 80 pounds as illustrated by Curve C is sufficient to overcome spurious steering inputs generated by the driver, the roadway or the steering system. Curve C is the composite resistance force resulting from addition of the compensator resistance force of curve B to the positive caster resistance force of curve A. By selecting appropriate compensator parameters, it is possible to provide a significantly increased level of resistance force over relatively small turning angles as compared to the resistance force provided by positive caster alone. In other words, the compensator generated resistance force, as a supplement to positive caster force, is most effective preferably for angles of turn of about 5° or less in either direction from the straight ahead position of the vehicle wheels. After the wheels have turned through angles greater than about 5° in either direction, the only force resisting further turning movements is that provided by positive wheel caster as illustrated by Curve C in FIG. 2.

While the effect of the compensator preferably operates over a turning angle of about 5° or less to either side of center, it is considered within the scope of the present invention to slope the surface 73 of disc 72 and the corresponding surface of disc 66 so as to provide a supplemental resistance force over any turning range desired. For example, the surfaces of discs 66 and 72 on which the balls 70 ride when out of centering depressions 68 and 71 can be sloped or otherwise cut to provide a resistance force for any turning angle between center (0°) and 45° to either side of center. Likewise, the level of this resistance force can be increased or decreased by merely increasing or decreasing the contact pressure applied to balls 70 by springs 76 and 78.

Referring to FIG. 7, the centering depressions 68 and 71 are preferably contoured in a manner providing a relatively high level of resistance to initial "break away" from center so that a corresponding break away steering force is required to initiate a turning movement. This break away resistance feature is provided by making balls 70 of a substantially larger radius $R_1$ than radius $R_2$ of the centering depressions. Because of this difference in radii, the balls contact the centering depressions only along a rim portion 100 of each centering depression. Rim 100 preferably is rounded slightly or formed as a narrow flat band (resembling a band around the periphery of a cone with its apex toward the disc) so as to minimize wear as the balls travel in and out of the centering depressions.

The range of contact pressures available between the balls and the centering depressions should be selected so that the break away resistance can be selectively varied by the vehicle operation from relatively soft at low speeds to relatively hard at high speeds through adjustment of spring compression as previously described. As another alternative, the break away resistance can be varied directly in response to vehicle speed by having motor 46 controlled by a speed detecting and control mechanism for correlating the number of turns of motor 46 with different speed values. For example, a speed detection mechanism (not shown) could comprise a core movable within an electric coil, the core being connected to a diaphragm responsive to a fluid pressure related to vehicle speed such as that available on motor vehicles from a power steering system. Motor 46 could be actuated by a speed signal from this mechanism so as to achieve a corresponding number of turns relative to a zero position at which substantially all spring pressure is released. This arrangement has the advantage of automatically driving spring cup 83 to its uppermost position so as to deactivate the compensator in response to a loss of steering power.

Undercutting the radius of depressions 68 and 71 relative to the radius of balls 70 has the further advantage of preventing balls 70 from overshooting their centered position wherein they are in contact with the entire periphery of centering depression rim 100. This undercut seating arrangement significantly reduces the chance of over-steering by providing a steering system with a positive break away resistance either to initiating turning movement when already in the center position or to travel beyond the center position when returning to center after a previous turning movement toward either side thereof.

Another feature of the interaction between balls 70 and depressions 68 and 71 is provided by the presence of a fluid metering aperture 102 which is preferably located near the bottom of each centering depression in spaced relation to the rim 100. Balls 70 and rims 100 are preferably machined to a sufficiently close tolerance that the engagement between each ball and the rim of its corresponding centering depression forms a liquid seal between the ball and the rim. Chamber 80 of housing 81 is preferably filled with hydraulic fluid or other liquid so that movement of balls 70 into and out of the centering depressions will tend to pump this fluid through apertures 102, thereby providing viscous dampening of movement of the balls either toward or away from sealing engagement with rims 100. Metering apertures 102 thus provide a controlled breaking of the vacuum that would otherwise be present in depression pocket 101 as the balls are forced out of sealing engagement with their seats 100. In other words, suction tends to hold the balls on their seats until the lower pressure created by the tendency of the balls to move away from their seats is equalized with that of the surrounding body of fluid through apertures 102.

A particular important feature of the invention is the provision of a remotely operable trimming means for selectively varying the preselected center position of the steerable member as achieved when balls 70 are centered in their corresponding centering depressions. The trimming mechanism for the rotary compensator of FIG. 1 is illustrated best in FIGS. 3, 5 and 6. Actuation of solenoid 50 to its trimming position by closure of switch 44 causes drive rod 54 to move in the direction of arrow T so that shifter head 92 rotatably engages socket 105 of a trimming pinion 106. The teeth of pinion 106 in turn engage a drive gear 107 meshing with a driven gear 108. Gear 107 threadingly engages a first trim screw 110 and driven gear 108 threadingly engages a second trim screw 112. Screw 110 is pivotally connected to a carriage 114 by a pin 116 and screw 112 is pivotally connected to the same carriage by a pin 118. Carriage 114 is secured to an annular flange 117 of detent disc 72 by a pair of force fitted retainer pins 119-119. Retainer pins 119-119 also secure pivot pins 116 and 118 in a fixed position within apertures of carriage 114. Clockwise rotation of gear 107 causes axially movement of screw 110 in the direction of arrow R so as to cause trimming movement of wheels 36-36 toward the right. Clockwise rotation of gear 107 produces counterclockwise rotation of gear 108 so as to push screw 112 axially in the opposite direction from screw 110 since the threads of both screws are right handed for purposes of this illustration. Similarly, counterclockwise rotation of gear 107 causes screw 110 to move axially in the direction of arrow L and also causes clockwise rotation of gear 108 so as to move screw 112 in the opposite direction, thereby providing trimming movement of wheels 36-36 toward the left. Limit switches 120 and 121 may be provided to cut off motor 46 automatically so as to prevent excessive trimming movement to the left or to the right, respectively.

Due to the contact pressure between balls 70 and centering depressions 68 and 71, rotary trimming movement of carriage 114 and attached detent disc 72 causes a corresponding rotational movement of follower disc 66. This rotational adjustment of the center position of disc 66 is translated into linear trimming movement of tie rod 25 by extensible arm 42 which is pivoted by disc 66 through output shaft 64.

Another feature of this embodiment is the provision of means for removing mechanical slack from the threaded engagement between gears and screws and from the connections between screws 110 and 112 and trimming carriage 114. The slack removal means comprises a nut 124 having a socket 125 for an allen wrench and carrying a thrust bearing 126. Tightening of nut 124 forces bearing 126 against gear 108 which in turn provides thrust through screw 112, pin 118, carriage 114, and pin 116 so as to force screw 110 against a second thrust bearing 128 carried by an end plate 130 of housing 81.

After nut 124 has been tightened sufficiently to remove mechanical slack from the elements connected to screws 110 and 112, nut 124 is locked in position by a locking nut 132. plate 130 provides a gear chamber 134 of sufficient depth to permit axial movement of gears 107 and 108 and screws 110 and 112 so as to accomplish the slack removal functions provided by nut 124 and associated thrust bearings 126 and 128.

A linear embodiment of the steering compensator of the invention is shown in FIGS. 8-14. This compensator comprises a casing 140 of substantially square or rectangular cross-section. The outer end of casing 140 is secured to tie rod 25 by an end fitting 142 having a pivotal connection 143 clamped to the tie rod by means of a U-bolts 144 and an opposing bracket plate 145. The opposite end of the linear compensator comprises an extensible tube 148 having an end fitting 150 pivotally connected to axle 24 or some other frame member of the vehicle by a pivotal connection 151. End fittings 142 and 150 may be identical and preferably comprise a mounting disc 153 forming part of pivotal connection 151 and sandwiched between a pair of elastomer bushings 154 and 155 which are compressed against disc 153 by opposing compression discs 156 and 157. A pair of lock nuts 158-158 secure end fitting 150 to the outer end of a trimming rod 160. End fitting 142 is secured to a connecting rod 162 mounted on an end plug 164 of casing 140 by a pair of lock nuts 163-163.

Away from center movement of tie rod 25 is resisted by the linear compensator because of the contact pressure between a pair of follower rollers 165 and 166 and their corresponding centering depressions 167 and 168, respectively, which are formed in the sidewalls of casing 140 as shown best in FIG. 10. Follower rollers 165 and 166 are rotatably mounted on a pair of links 161-161 and 164-164, respectively, and each of these links is pivotally secured to the inner end of tube 148 by a pair of U-shaped forks 169-169. The relative positions of follower rollers 165 and 166 after they have been forced out of their respective centering depressions by turning movement of the vehicle are shown in FIG. 9. The radius of depressions 167 and 168 is substantially less than the radius of rollers 165 and 166 so as to ensure a precise break away force similar to that provided by the ball and undercut seat relationship shown in FIG. 7.

In this first linear embodiment, contact pressure between the rollers and the centering depressions is provided by a pair of axially spaced pressure rollers 170 and 171 in contact with follower roller 165 and a central pressure roller 172 in contact with follower roller 166. Pressure rollers 170 and 171 are rotatably mounted on axially aligned end journals 174 and 175, respectively, carried by an axle member 176 having a central journal portion 177 on which pressure roller 172 is rotatably mounted. The axes of end journals 174 and 175 are offset radially from the axis of central journal 177 so that rollers 170 and 171 on the one hand and roller 172 on the other hand contact opposite follower rollers without interfering with each other.

Axle 176 is carried for reciprocal movement by a fork assembly 179 having ears 180 and 181 positioned on either side of central pressure roller 172. Fork 179 has a shaft 182 connected to a piston rod 184 carrying a piston member 185. Piston 185 is carried on rod 184 for reciprocal movement between opposing end members 187 and 188 which cooperate with a sleeve 189 to form a fluid pressure chamber 190. Piston 185 includes an orifice 192 for providing viscous dampening of turning movements away from center and a check valve 194 for providing a free return to center without viscous dampening. While check valve 194 is identified in FIG. 10, the details of this valve can be seen more clearly by the enlargement of this feature in FIG. 12. The check valve includes a ball valve member 191 and a relatively weak seating spring 193 for properly seating the ball valve. The force of spring 193 does not provide significant resistance to flow through aperture 195 during movement of piston 192 to reseat rollers 165 and 166 in centering depressions 167 and 168.

Contact pressure for resisting away from center movement is provided by a coil spring 196 which provides spring force that is transmitted to the follower rollers through a retaining disc 197, piston rod 184, fork 179 and pressure rollers 170, 171 and 172. Compression of spring 196 is adjustable by means of an axially adjustable spring cup 199 having a threaded collar 200 engaged by a jack screw 201. The axial position of retaining cup 199 may be varied by rotating jack screw 201 which is connected to a force motor 203 by a series of planetary reduction gears 204 and 205 and a thrust bearing 206. As shown best in FIG. 13, each planetary reduction gear comprises a fixed outer gear 208 rigidly secured to the wall of extensible tube 148 and engaged by four pinion gears 210 which rotate around journals 214 so as to transmit a drive force from a central spline 212 of motor 203 to a rotary disc 215 having a spline 213 engaging the next reduction gear 205 in the series. Reduction gear 205 drives base 202 of jack screw 201 through thrust bearing 206.

Preferably connected to spring retainer 199 is one end of an actuator rod 220 having a cam shoulder 226. The opposite end of rod 220 is slidably supported by a bracket 222 mounted on an internal surface of extensible tube 148. Also mounted on tube 148 are two limit switches 224 and 225 which may be actuated by reciprocation of cam 226. Switch 224 limits the maximum resistance force provided by motor 203 acting through spring 196 and switch 225 provides an automatic cut-off when adjustable cup 199 bottoms out against base 202 of jack screw 201.

The centered position of the linear compensator and thereby the centered position of steerable wheels 36-36 is adjustable by a trim motor 230 which drives a jack screw 232 through a pair of reduction gears 233 and 234 and a thrust bearing 235. Thrust bearing 235 includes an opposing retainer bearing 236 so as to provide thrust bearing surfaces for both extension and retraction of trimming rod 160 which is threadedly engaged by jack screw 232. With the follower rollers pressed into their corresponding centering depressions as illustrated in FIG. 10, axial adjustment of trimming rod 160 by rotation of jack screw 232 will cause linear movement of tie rod 25 relative to frame member 24 so as to change the centered position of steerable wheels 36-36.

A base 238 of trimming rod 160 is connected to a second actuator rod 240 having a cam shoulder 244. The other end of actuator rod 240 is slidably mounted in a bracket 242 mounted on an internal surface of extensible tube 148. Shoulder 244 actuates a pair of limit switches 245 and 246. Limit switch 246 cuts off trimming motor 230 when trimming rod 160 bottoms out against jack screw bearing 236. Switch 245 cuts off trimming motor 230 when trimming rod 160 reaches its outer limit of travel in abutment with an end plug 248 closing the outer end of tube 148. Plug 248 has an aperture 249 containing a dust seal through which trimming rod 160 reciprocates. A similar dust seal may also be provided at the telescopic connection between casing 140 and tube 148.

When the resistance force provided through follower rollers 165 and 166 is overcome by a steering force in either direction, rollers 165 and 166 are compressed together against the action of spring 196 and travel out of centering depressions 167 and 168. This acting forces piston 185 toward end 187 of pressure chamber 190. Thus, the follower rollers and extensible tube 148 on which they are mounted are free to reciprocate within casing 140 to either side of depressions 167 and 168, depending upon the direction of the turn. Similarly, when tube 148 is centered relative to casing 140 so that rollers 165 and 166 are in contact with opposite sides of depressions 167 and 168, trimming rod 160 may be reciprocated in either direction relative to tube 148 so as to selectively adjust the centered position of the steerable wheels 36-36. This center position may be defined by the linear distance between the connection of end fitting 150 to frame member 24 and the connection of end fitting 142 to tie rod 25. These fittings, of course, may be reversed so that casing 140 is connected to frame member 24 and extensible tube 148 is connected to tie rod 25.

The trimming feature and the variable resistance feature of both the rotary compensator of FIGS. 3-6 and the linear compensator of FIGS. 9-14 are remotely adjustable while the vehicle is in operation. One means of providing these remote adjustments is illustrated by the electrical circuit in FIG. 15 for connecting the trim and resistance force motors to a source of electrical power E. The circuit shown in solid lines is that for operating combined trim and resistance varying motor 46 of FIG. 1. Switches 44 and 48 are preferably both of the momentary type with a toggle spring loaded into the open position so that the switch automatically opens when its toggle is released. Upon closure of contacts 251-251 of switch 48, reversible motor 46 is actuated to increase the resistance force by causing spring 76 to be compressed as previously described. Upon closure of contacts 252-252 of switch 48, motor 46 rotates in the opposite direction so as to release or decompress spring 76 and thereby decrease the resistance force. Limit switches 98 and 100 are of the normally closed type and when opened, cut off the power to motor 46.

The resistance force circuitry also preferably includes a normally open switch 254 which is held open by a solenoid 255 against the pressure of a spring 256 biasing the switch mechanism toward its closed position. Solenoid 255 is energized to hold the switch open in response to a second switch (not shown) which closes an electrical power circuit to the solenoid in response to fluid pressure in the power steering system indicating that the power steering system is operative. Upon a loss of power steering and the associated fluid pressure, solenoid 255 is deenergized so that switch 254 is closed by spring 256. Closure of switch 254 automatically operates motor 46 in the direction releasing or decompressing spring 76 until spring cup 83 is withdrawn to its fully released position opening limit switch 100.

The center position of the steerable wheels is selectively variable by operating switch 44. Closure of contacts 258-258 actuates motor 46 through a coil 260 associated with solenoid 50. Activation of coil 260 causes solenoid 50 to move drive rod 54 in the direction T causing shifter head 92 to engage trim pinion 106 as shown best in FIG. 6. Rotation of motor 46 then causes trimming movement of steerable wheels 36-36 to the right. Similarly, moving the toggle of switch 44 so as to close contacts 262-262 energizes motor 46 through coil 260 so as to rotate drive rod 54 in the opposite direction with head 92 still engaging trim pinion 106, thereby providing trimming movement of steerable wheels 36-36 to the left.

The only difference in the circuitry of FIG. 15 for operation of the linear compensator is the substitution of a second trimming motor 203 for solenoid 50, this substitution being represented by the dotted lines connecting the circuitry of switch 44 to motor 230 and dotted line 261 indicating isolation of the separate motor circuits. In this embodiment, operation of toggle switch 48 supplies power directly to resistance force motor 203 through normally closed limit switches 224 and 225. Closure of toggle switch 44 supplies power directly to trim motor 230 through normally closed limit switches 245 and 246.

Referring to FIG. 16, there is shown a second linear compensator embodiment employing a single motor 264 in combination with a shift solenoid 265 to provide motive power for both remote trimming and remotely varying the turning resistance. This linear compensator comprises a casing 266 with a mounting eye 268 for pivotally connecting the casing either to the tie rod or a frame member of a motor vehicle. A connecting rod 270 has an eye 271 for pivotally connecting rod 270 to either the frame or the tie rod of the same vehicle, i.e., to mounting component opposite to that which the casing is connected to.

A detent member 272 is carried on the inner end of rod 270 and has a pair of centering depressions 273 and 274 on opposite sides thereof. Two opposing follower balls 276 and 277 are pressed into centering depressions 273 and 274, respectively, by spring loaded ball retainers 279 and 280. These ball retainers include frictionless type retainer members 281 and 282 of teflon or like material allowing balls 276 and 277 to rotate freely within respective ball retainers 279 and 280. The spring force pressing the follower balls into their corresponding depressions is provided by a pair of leaf springs 284 and 285 carrying retainers 279 and 280 on their free ends. Stiffening members 287 and 288 are adjustable longitudinal along leaf springs 284 and 285 by means of a threaded collar 290 engaged by threads on the exterior surface of a cylindrical carriage 292 which also forms a mounting for the ends of leaf springs 284 and 285 opposite from ball retainers 279 and 280. Collar 290 is rotatably driven for axial movement in relation to carriage 292 by a spline 294 connected by a driven gear 295 to a force gear 296. Force gear 296 is mounted on a rotatable shaft 298 driven through a reduction gear 297 by reversible motor 264. Operation of motor 264 so that stiffeners 287 and 288 move away from retainers 279 and 280 decreases the spring force and thereby the turning resistance provided by leaf springs 284 and 285. Rotation of motor 264 in the opposite direction so that stiffeners 287 and 288 move toward retainers 279 and 280 increases the spring force and turning resistance in like manner.

Trimming adjustment of the center position of rod 270 relative to casing 266, and thereby the centered position of steerable wheels 36-36, is provided by axial adjustment of carriage 292 relative to an internal trim screw 300 which engages internal threads along a portion of a bore 301 of carriage 292. Rotation of trim screw 300 relative to carriage 292 is caused by rotation of a driven gear 302 on the opposite end of screw 300. Driven gear 302 is engaged by a trim gear 304 on shaft 298 upon selective actuation of solenoid 265 so as to shift shaft 298 toward this solenoid, thereby compressing a return spring 306 between a shoulder 308 on shaft 298 and a journal member 310 for rotatably mounting shaft 298. Actuation of solenoid 265 thus disengages force gear 296 from driven gear 295 and engages trim gear 304 with driven gear 302 so that rotation of shaft 298 provides a trimming action instead of a resistance force varying action. Deactivation of solenoid 265 causes disengagement of trim gear 304 and reengagement of force gear 296 in response to the biasing force provided by return spring 306. The electrical circuit for remotely operating reversible motor 264 and solenoid 265 may be the same as that illustrated in FIG. 15 for operation of motor 46 and solenoid 50.

Viscous dampening is available with the embodiment of FIG. 16 by filling chamber 312 defined by casing 266 with hydraulic fluid or the like and providing fluid passageways 314, 315 and 316 in fluid communication with centering depressions 273 and 274. Where chamber 312 is filled with fluid, driven gear 295 is positioned outside of casing end member 318 and appropriate fluid seals (not shown) are provided to prevent leakage of fluid from chamber 312.

In FIG. 17, there is shown a modification of the invention of FIGS. 9–14 in that metering orifice 192 in piston 185 has been replaced by a magnetically controlled differential pressure valve 320. Valve 320 is comprised of an electro-magnetic seat 322 connected to a source of electrical power by wires 323 and 324, and a ball valve 326 of iron or other magnetic material. Ball valve 326 is held in position by a relatively weak compression spring 327 similar to check valve spring 193 of FIG. 12. The valve components are housed within a chamber 328, one side of which communicates with the pressure side of piston chamber 190 through an apertures in valve seat 322 and with the return or pressure free side of chamber 190 through a metering orifice 330. An electro-magnetic coil is incorporated in valve seat 322 and the level of magnetic flux generated by this coil determines the pressure required to unseat valve 326 so that fluid may flow into the chamber 328 through the valve seat and out of this chamber through orifice 330.

Magnetic valve 320 thus provides an additional level of variable resistance that must be overcome for the steering system to "break away" into a turning movement. Thus, until the pressure in chamber 190 on the pressure side of piston 185 exceeds the differential pressure setting of valve 320, movement of piston 184 is prevented by liquid trapped between piston 185 and cylinder end member 187. When the pressure setting of differential pressure valve 320 is reached, the pressure on valve 326 overcomes the magnetic attraction of seat 322, permitting valve 326 to move away from its seat so that fluid flows from one side of piston 185 to the other through chamber 328. Orifice 330 controls the rate of this fluid flow so as to provide viscous dampening to turning movement away from center. The differential pressure setting of valve 320 is remotely variable by varying the amount of electric current supplied to the coil in seat 322. In other words, wires 323 and 324 are connected to the source of electrical power through control mechanism 43 which is accessible to the driver as shown in FIG. 1 and is capable of varying the current. Movement of follower rollers 165 and 166 out of depressions 167 and 168 requires a turning force sufficient to overcome both the bias of spring 196 and the pressure setting of valve 320.

A third linear embodiment of the invention employs a magnetically operated differential pressure valve as shown in FIGS. 18–20. This embodiment of the invention comprises a cylinder 340 containing a piston 341 of magnetic material mounted on a shoulder 342 of a connecting rod 343. Cylinder 340 and piston 341 define a left turn pressure chamber 344 and a right turn pressure chamber 345 in which piston 341 reciprocates to either side of a center position defined by a field coil 346 surrounded by a pole piece 347. The outer end of rod 343 has an eye 349 for pivotally connecting the rod to either the tie rod or a frame member of a motor vehicle. At the opposite end of cylinder 340 is a casing 350 defining a fluid reservoir 351. The outer end of reservoir casing 350 opposite from connecting rod eye 349 is a similar eye 352 for pivotally connecting casing 350 and cylinder 340 to the tie rod or a frame member of a motor vehicle.

As seen best in FIG. 20, magnetic piston 341 comprises a core disc 355 on opposite sides of which are identical armature discs 356 and 357. Carried within chambers 358 and 359 of core 355 are two valve members 360 and 361, respectively. Valves 360 and 361 sealingly engage a valve seat around passages 362 and 363, respectively, upon being pressed toward these passages by the armature discs 356 and 357. The force with which discs 356 and 357 press valves 360 and 361 against their respective seats depends upon the level of magnetic flux generated by field coil 346. By varying the coil current and thereby the level of magnetic flux with remote control mechanism 43 which is connected to coil 346 by wires 348 and 353, the differential pressure required to open these valves is selectively variable. The steering force required to move piston 341 in the direction extending rod 343 is controlled by armature 357 and valve 361 and the steering force required to move piston 341 in the direction retracting rod 343 is controlled by armature 356 and valve 360.

So that fluid may freely communicate with passages 362 and 363 and with the opposite ends of valve chambers 358 and 359, armature discs 356 and 357 are provided with a series of apertures 367 and an annular cavity 368. The three piston discs 355, 356 and 357 are slidably mounted upon shoulder 342 of connecting rod 343 and are retained on this shoulder by retainer rings 370-370. O-ring seals 371 and 372 are preferably provided in grooves along the outer and inner periphery of core disc 355 so as to prevent fluid flow around these peripheries instead of through valve passages 362 and 363.

Since fluid in cylinder 340 moves from one side of piston 341 to the other as the piston moves, normally there is no transfer of fluid between cylinder 340 and reservoir 351. However, upon overpressurization of cylinder 340 due to thermal expansion or the like, a relief valve 372 releases fluid from cylinder chamber 345 into reservoir chamber 351. Upon a return of cylinder pressure to normal ranges, fluid then flows back from reservoir chamber 351 into cylinder chamber 345 through a check valve 373. An annular air bag 375 is provided within reservoir chamber 351 so as to maintain the pressure of fluid in this chamber slightly above the normal range of fluid pressures within cylinder 340. Air bag 375 is pressurized with air to the desired pneumatic pressure through a valve 376 which may be of the type used on automobile tires. In order to protect air bag 375 from damage upon reciprocal movement of an inner guide portion of rod 343, this guide portion travels within a sleeve 378. Underpressurization of chamber 351 due to extension of rod 343 is compensated for by air bag 375 while overpressurization of chamber 351 due to retraction of rod 343 is prevented by check valve 373.

With relatively minor modifications, the magnetic piston and valve assembly of FIGS. 18-20 may be used in place of piston 185 of tear spring-loaded compensator of FIGS. 9–14. by this application, armature disc 357 and valve 361 would be omitted and replaced by the check valve assembly of FIG. 12 since the break away force provided by valve 360 and armature disc 356 is available for turning movements in either direction with the spring resistance mechanism of this embodiment as shown best in FIGS. 9 and 10. In the combined embodiment here described, field coil 346 and pole piece 347 may be positioned either around sleeve 189 forming fluid cylinder 190, around telescopic tubular member 148, or around casing 140, depending upon the strength of the field coil used. Preferably, the field coil and pole piece are positioned between sleeve 189 and the concentric wall of tube 148 so as to minimize the power requirements of the field coil.

Similarly, the trimming components of the linear embodiment of FIGS. 9-14 may be combined with the magnetic piston assembly of FIGS. 18-20 so as to provide this assembly with a remote trimming feature according to the invention. More specifically, the end fitting 352 of FIG. 18 may be replaced by the trimming mechanism of FIG. 9 comprising pivot member 151, end fitting 150, trimming rod 160, trim motor 230 and related elements 233-249.

INDUSTRIAL APPLICABILITY

As illustrated in the foregoing description, the invention is applicable to motor vehicles both with and without power steering systems. The invention can provide centering compensation for the steering system of a wide variety of vehicles, including automobiles, trucks, motorcycles and other on the highway and off the highway motor vehicles, and also small boats, large ships, and aircraft. The invention also has a wide range of other industrial applications and can be utilized to automatically center any device having a steering member interconnected by suitable linkages to a steerable member.

All embodiments of the invention can be used both with other tie rod arrangements and with steering systems that do not require tie rod arrangements, such as those with only one steerable member, such as the rudder of a ship or airplane. Without the compensator of the present invention, spurious steering forces of relatively small magnitude can cause a vehicle steering system to move to one side or the other of center or to oscillate back and forth, thereby producing corresponding movements of the vehicle away from the desired direction of vehicular travel. In the operation of roadway motor vehicles, such spurious inputs may be caused by road forces acting on the vehicle wheels, environmental forces acting on the vehicle body, driver forces acting on the steering wheel, off-center bias inherent in the steering system itself, or any combination of one or more of these forces.

On motor vehicles the steering compensators of the invention are located between the steerable wheels and the reduction gear assembly driven by the steering column. As a result, spurious inputs from the steering column and/or from a power steering unit activated by that column are absorbed by the compensator before reaching the vehicle wheels. Likewise, spurious forces transmitted from the roadway are absorbed by the compensator instead of being transmitted by the tie rod to the reduction gear and related steering components. As a result, the compensator protects the interior components of the steering system from repeatedly oscillating between states of tension and compression. Such oscillations can produce fatigue failure of system components.

The variable resistance force components can be used alone as a centering mechanism without a remote trimming feature. These components can also be used in combination with assemblies of the spring-biased or pneumatically or hydraulically actuated type for returning a steering system to a center position.

The remote trimming features of the invention are usable not only with the compensators disclosed here, but also in combination with centering mechanism of the prior art, such as those disclosed in U.S. Pat. Nos. 3,056,461; 3,183,992; 3,373,631; 3,426,612; and 3,583,515; the entire contents of which are expressly incorporated herein by reference. Thus, the remotely operable trimming components can be combined with centering devices of known types to provide adjustment of the center position during vehicle operation. In addition, a number of modifications to both the variable resistance components and to the trimming components specifically disclosed are possible without departing from the scope of the invention.

What is claimed is:

1. A steering compensator apparatus for a steering system of a vehicle having at leat one steerable member movable away from a preselected position in response to a steering force, said apparatus comprising:
cam means including a detent member having at least one centering depression and at least one follower member in contact with opposite sides of said centering depression when said steerable member is in said preselected position;
connecting means for moving said follower member and said detent member relative to each other in response to movement of said steerable member away from said preselected position;
compression means for pressing together said follower member and said detent member so that contact pressure between said follower member and said centering depression resists relative movement between said detent member and said follower member and prevents substantial movement of said steerable member away from said preselected position until said steering force exceeds a predetermined value;
adjusting means operable for varying the contact pressure between said follower member and said centering depression so as to vary the amount of steering force required for substantial movement of said steerable member away from said preselected position; and,
control means for remotely operating said adjusting means so as to selectively vary the amount of said contact pressure while said vehicle is in operation.

2. The apparatus of claim 1 in which said follower member has a first radius of curvature and said centering depression has a second radius of curvature substantially smaller than said first radius of curvature so that contact between said follower member and said centering depression occurs along a rim portion of said centering depression.

3. The apparatus of claim 1 in which said compression means includes resilient means for providing a resilient force pressing together said follower member and said detent member, and in which said adjusting means includes varying means for selectively varying the amount of said resilient force.

4. The apparatus of claim 3 in which said varying means includes a reversible electric motor for rotating one threaded member relative to another threaded member.

5. The apparatus of claim 3 in which said resilient means provides said resilient force in response to compression of said resilient means, and in which said varying means selectively varies the amount of said compression.

6. The apparatus of claim 1 in which said compression means includes spring means for biasing said follower member and said detent member toward each other, and in which said adjusting means includes an electric motor and means for causing engagement between said electric motor and said spring means so that operation of said electric motor varies the amount of contact pressure provided by said spring means.

7. The apparatus of claim 1 which further includes trim means operable for varying said preselected position of said steerable member; and control means for remotely operating said trim means so as to selectively vary said preselected position of said steerable member while said vehicle is in operation.

8. The apparatus of claim 7 which further includes stop means for limiting the range of trimming movement provided by said trim means.

9. The apparatus of claim 7 which further includes slack removal means for removing mechanical slack from said trim means.

10. The apparatus of claim 7 for a steering system having at least one steerable member mounted on a frame, and in which:
said connecting means includes linkage means for connecting said cam means to said frame at a first point of connection and for connecting said cam means to said steering system at a second point of connection in spaced relation to said first point of connection, said spaced relation defining a centered distance when said steerable member is in said preselected position;
said trim means includes drive means operable for causing said linkage means to vary said centered distance; and,
said control means includes means for remotely operating said drive means so as to selectively vary said centered distance while said vehicle is in operation.

11. The apparatus of claim 10 in which said trim means further includes a first threaded member engaged by a gear means, and in which said drive means includes a reversible electric motor for moving said gear means relative to said first threaded member.

12. The apparatus of claim 11 in which said trim means further includes a second threaded member engaged by said gear means, and slack removal means for moving said first threaded member relative to said second threaded member so as to remove mechanical slack from said threaded engagement.

13. The apparatus of claim 1 which further includes a centering member movable with said steerable member and having a centered position relative to a frame of said vehicle corresponding to the preselected position of said steerable member, and trim means for changing the centered position of said centering member relative to said vehicle frame so as to selectively vary the preselected position of said steerable member while said vehicle is in operation.

14. The apparatus of claim 13 in which said trim means includes drive means for causing trimming movement of said centering member in response to at least one remote input so as to change said centered position while said vehicle is in operation, said control means for selectively providing said at least one remote input to said drive means from a location remote to said cam means such as a driver's station of said vehicle.

15. The apparatus of claim 1 in which said cam means includes a plurality of follower members and a common detent member having a plurality of centering depressions one for receiving each of said plurality of follower members.

16. The apparatus of claim 1 in which said follower member engages the rim of said centering depression so as to form a liquid seal between said follower member and said rim, in which said centering depression includes an aperture in spaced relation to said rim, and in which said apparatus further includes liquid means for keeping said centering depression filled with a liquid, said aperture providing fluid resistance to movement of said follower member away from sealing engagement with said rim.

17. The apparatus of claim 1 in which said follower member and said detent member are arranged for linear movement relative to each other.

18. The apparatus of claim 17 in which said detent member comprises a casing and said follower member is arranged for linear movement within said casing.

19. The apparatus of claim 18 in which said follower member includes a pair of opposing detent rollers for engaging at least one centering depression in said casing; and in which said compression means includes axle member having at least two journals and at least pressure rollers rotatably mounted upon said journals, the rotational axes of said journals being radially offset from each other so that one of said pressure rollers is in contact with one of said detent rollers and the other of said pressure rollers is in contact with the other of said detent rollers.

20. The apparatus of claim 19 in which said casing has an annular centering depression for receiving both of said detent rollers.

21. The apparatus of claim 1 in said follower member and said detent member are arranged for rotary movement relative to each other.

22. The apparatus of claim 21 in which said cam means includes a plurality of rollers in spaced relation to each other, means for retaining said rollers in said spaced relation, and a common detent member having a plurality of centering depressions one for receiving each of said rollers, said centering depressions having a spaced relation corresponding to the spaced relation of said rollers.

23. The apparatus of claim 21 in which said connecting means includes linkage means for connecting said cam means and said steerable member, said linkage means comprising a first member and a second member movable relative to each other between a retracted position and an extended position; and means for retaining said first and second members in said retracted position when said follower member is in contact with said centering depression.

24. The apparatus of claim 23 in which said retaining means includes biasing means for resiliently biasing said first and second linkage members toward said retracted position.

25. The apparatus of claim 1 which further includes:
adjusting means operable for varying the contact pressure between said follower member and said centering depression so as to vary the amount of steering force required for substantial movement of said steerable member away from said preselected position;
trim means operable for varying said preselected position of said steerable member, and,
control means for remotely operating said adjusting means and/or said trim means so as to selectively vary said contact pressure and/or said preselected position of the steerable member while said vehicle is in operation.

26. The apparatus of claim 1 in which said compression means includes spring means for biasing said follower member and said detent member toward each other so that contact pressure between said follower member and said centering depression resists relative movement between said detent member and said follower member.

27. The apparatus of claim 26 in which said spring means comprises a coil spring.

28. The apparatus of claim 26 in which said spring means comprises a leaf spring.

29. The apparatus of claim 1 which further includes dampening means for providing liquid dampening of the relative movement between said follower member and said detent member.

30. The apparatus of claim 1 for a vehicle having power means for supplementing said steering force, said apparatus further including means for reducing said contact pressure substantially to zero in response to a loss of said steering power.

31. The apparatus of claim 1 for a steering system having a reduction gear between said steerable member and a steering member, and in which said cam means is connected to said steering system at a location between said steerable member and said reduction gear.

32. A steering compensator apparatus for providing a resistance force preventing substantial movement of at least one steerable member away from a preselected position until a steering force exceeds a predetermined value, said apparatus comprising:

fluid means for pressurizing a fluid and causing said fluid to flow in response to movement of said at least one steerable member away from said preselected position;

valve means for preventing said fluid flow until said fluid means provides a preselected amount of differential pressure across said valve means, said valve means including a valve member and a seat member movable relative to each other between an open position providing said fluid flow and a closed position preventing said fluid flow; and, magnetic means for providing a magnetic force holding said valve member and said seat member in said closed position until said fluid means provides said preselected amount of differential pressure.

33. The apparatus of claim 32 in which said magnetic means includes means for varying the level of said magnetic force so as to vary the preselected amount of differential pressure at which said valve means provides said fluid flow, and in which said apparatus further includes control means for selectively varying the level of said magnetic force while said vehicle is in operation.

34. A steering compensator apparatus for a steering system of a vehicle having at least one steerable member movable away from a preselected position in response to a steering force, said apparatus comprising:

cam means including at least one follower member and a detent member having at least one centering depression, said at least one follower member having a seated position in contact with opposite sides of said centering depression when said steerable member is in said preselected position;

connecting means for moving said follower member and said detent member relative to each other in response to movement of said steerable member away from said preselected position; and, compression means for pressing together said follower member and said detent member so that contact pressure between said follower member and said centering depression resists relative movement between said detent member and said follower member for a predetermined distance to either side of said preselected position;

wherein said contact pressure prevents substantial movement of said steerable member away from said preselected position until said steering force exceeds a predetermined value when said follower member is in said seated position;

and wherein said follower member has a first radius of curvature and said centering depression has a second radius of curvature substantially smaller than said first radius of curvature so that in said seated position said follower member contacts a rim portion of said centering depression, said rim portion having a shape providing substantially a line of contact between said follower member and said centering depression.

35. The apparatus of claim 34 in which said follower member engages the rim of said centering depression so as to form a liquid seal between said follower member and said rim, in which said centering depression includes an aperture in spaced relation to said rim, and in which said apparatus further includes liquid means for keeping said centering depressron filled with a liquid, said aperture providing fluid resistance to movement of said follower member away from sealing engagement with said rim.

36. The apparatus of claim 34 for a steering system having a reduction gear between said steerable member and a steering member, in which said connecting means connects said cam means to a frame of said vehicle and to said steering system at a location between said steerable member and said reduction gear, and in which the location of said steering system connection and the line of contact provided between said follower member and said centering depression when said follower member is in said seated position substantially eliminates mechanical slack between said frame and said steerable member.

* * * * *